US012623713B2

(12) United States Patent
Scholz

(10) Patent No.: US 12,623,713 B2
(45) Date of Patent: May 12, 2026

(54) ELECTRIC POWER STEERING SYSTEM FOR A VEHICLE

(71) Applicant: MCMURTRY AUTOMOTIVE LIMITED, Wotton-Under-Edge (GB)

(72) Inventor: George Karl Scholz, Wotton-under-Edge (GB)

( * ) Notice: Subject to any disclaimer, the term of this patent is extended or adjusted under 35 U.S.C. 154(b) by 598 days.

(21) Appl. No.: 18/005,172

(22) PCT Filed: Jul. 28, 2021

(86) PCT No.: PCT/EP2021/071103
§ 371 (c)(1),
(2) Date: Jan. 11, 2023

(87) PCT Pub. No.: WO2022/023397
PCT Pub. Date: Feb. 3, 2022

(65) Prior Publication Data
US 2023/0264734 A1    Aug. 24, 2023

(30) Foreign Application Priority Data

Jul. 31, 2020    (GB) ...................................... 2011916

(51) Int. Cl.
*B62D 5/04* (2006.01)
*H02K 5/20* (2006.01)
(Continued)

(52) U.S. Cl.
CPC ............. *B62D 5/0406* (2013.01); *B62D 5/04* (2013.01); *B62D 5/0403* (2013.01);
(Continued)

(58) Field of Classification Search
CPC ............ H02K 5/18; H02K 9/04; H02K 5/207; H02K 9/06; H02K 9/26; H02K 11/25;
(Continued)

(56) References Cited

U.S. PATENT DOCUMENTS 6,522,036 B1 * 2/2003 Chen ......................... H02K 9/18
310/58
6,909,211 B2 * 6/2005 Ciciliani .................. H02K 5/15
310/58
(Continued)

FOREIGN PATENT DOCUMENTS

CN        104716806 A  *  6/2015  ............... H02K 5/10
CN        208360286 U      1/2019
(Continued)

OTHER PUBLICATIONS

International Search Report for corresponding PCT/EP2021/071103 dated Nov. 3, 2021.
(Continued)

*Primary Examiner* — Timothy Wilhelm
(74) *Attorney, Agent, or Firm* — EGBERT, MCDANIEL & SWARTZ, PLLC

(57)                    ABSTRACT

Disclosed is an electric power steering system for a vehicle, the power steering system including: an electric motor configured to provide mechanical power to a steering mechanism of the vehicle for steering the vehicle; a housing in which the electric motor is disposed, wherein the housing comprises an inner housing in which the electric motor is disposed, and an outer housing disposed around the inner housing, and wherein an air flow path is defined within the housing, the air flow path being defined at least in part by a gap between the inner housing and the outer housing; and an air flow source arranged to generate an air flow along the air flow path to cool the electric motor, wherein the air flow source is independent from the electric motor.

19 Claims, 12 Drawing Sheets

(51) Int. Cl.

| | |
|---|---|
| *H02K 9/06* | (2006.01) |
| *H02K 9/26* | (2006.01) |
| *H02K 11/25* | (2016.01) |

(52) U.S. Cl.
  CPC ........... *B62D 5/0496* (2013.01); *H02K 5/207* (2021.01); *H02K 9/06* (2013.01); *H02K 9/26* (2013.01); *H02K 11/25* (2016.01)

(58) Field of Classification Search
  CPC .. B62D 5/0406; B62D 5/0496; B62D 5/0403; B62D 5/04
  See application file for complete search history.

(56) References Cited

U.S. PATENT DOCUMENTS

| | | | | |
|---|---|---|---|---|
| 8,674,565 B2 * | 3/2014 | Lang | ........................ | H02K 9/18 310/58 |
| 8,912,698 B2 * | 12/2014 | Fleming | ................. | H02K 9/227 310/89 |
| 9,331,550 B2 * | 5/2016 | Ganev | ....................... | H02K 9/14 |
| 9,991,759 B2 * | 6/2018 | White | ....................... | H02K 5/18 |
| 11,146,147 B2 * | 10/2021 | Goatley | ................. | H02K 9/227 |
| 11,148,527 B2 * | 10/2021 | Wolf | ........................ | F16C 27/04 |
| 12,009,731 B2 * | 6/2024 | Hwang | ................. | H02K 5/1675 |
| 12,126,239 B2 * | 10/2024 | Ogasawara | .............. | H02K 9/19 |
| 2006/0022529 A1 * | 2/2006 | De Filippis | ........... | F04D 29/329 310/58 |
| 2011/0282551 A1 | 11/2011 | Sasaki et al. | | |
| 2013/0076174 A1 * | 3/2013 | Wibben | ................... | H02K 9/14 310/64 |
| 2013/0093272 A1 * | 4/2013 | Shimono | ................. | H02K 9/14 310/64 |
| 2023/0098893 A1 * | 3/2023 | Yada | ........................ | H02K 5/18 301/6.5 |

FOREIGN PATENT DOCUMENTS

| | | |
|---|---|---|
| CN | 209617255 U | 11/2019 |
| DE | 102011100386 A1 | 11/2012 |
| GB | 2275901 A | 9/1994 |

OTHER PUBLICATIONS

Written Opinion of the International Searching Authority for corresponding PCT/EP2021/071103 dated dated Nov. 3, 2021.
International Preliminary Report on Patentability for corresponding PCT/EP2021/071103 dated dated Nov. 8, 2022.
OA in related CN 202180049674.9, dated Dec. 26, 2025.

* cited by examiner

ELECTRIC POWER STEERING SYSTEM FOR A VEHICLE

FIELD OF THE INVENTION

The present invention relates to an electric power steering system for a vehicle, in which an electric motor is configured to provide mechanical power to a steering mechanism of the vehicle.

BACKGROUND

When no power steering is used in a vehicle, all of the steering power is provided by the driver rotating the steering wheel. The steering wheel is typically directly coupled to a steering rack of the vehicle via a steering column and pinion. When a driver turns the steering wheel, the steering column and pinion are rotated, which causes the steering rack to be translated and the wheels to turn left or right (depending on the direction in which the steering wheel is turned). Thus, when all of the steering power is provided by the driver, a large amount of effort may be required from the driver in order to turn the wheels. Power steering systems are often used in vehicles in order to facilitate steering and manoeuvring of the vehicle. Power steering systems reduce an amount of effort that is required from the driver in order to turn the wheels, by providing mechanical power for steering the vehicle.

There exist various types of power steering systems. One type of power steering system is an electric power steering system, which uses an electric motor for applying a torque to the steering mechanism. In such an electric power steering system, when the driver rotates the steering wheel, a torque sensor detects a torque applied by the driver. A control unit of the electric power steering system then calculates, based on the detected torque, a torque to be applied to the steering mechanism by the electric motor. The control unit then transmits a control signal to a controller for the electric motor, to cause the electric motor to apply the calculated torque to the steering mechanism. In this manner, the torque applied by the driver may be supplemented by that from the electric motor, which may greatly facilitate turning the wheels. Electric power steering systems may also be used to perform steering in autonomous (i.e. self-driving) vehicles. In such a case, the control unit may calculate the torque to be applied by the electric motor based on an input signal from an autonomous driving system of the vehicle, in order to turn the wheels in a desired direction. An overview of electric power steering systems is provided, for example, in "New Electrical Power Steering Systems" by Mathias Würges (Encyclopedia of Automotive Engineering, 2014, DOI: 10.1002/9781118354179.auto008)

SUMMARY OF THE INVENTION

At its most general, a first aspect of the present invention provides an electric power steering system for a vehicle, the power steering system having an electric motor for providing mechanical power to a steering mechanism of the vehicle, where the electric motor is cooled by forced air cooling. By actively cooling the electric motor using forced air cooling, heat may be efficiently removed from the electric motor, which may enable the electric motor to achieve a higher continuous power output than an equivalent electric motor without forced air cooling. Using forced air cooling to efficiently remove heat from the electric motor may enable the electric motor to effectively deliver high levels of mechanical power for steering the vehicle. As a result, a performance of the power steering system may be improved, which may in turn improve steering performance and controllability of the vehicle. In particular, this may facilitate steering and control of the vehicle in conditions where high levels of power are required to turn the vehicle, such as when the vehicle is turning through a large angle or manoeuvring, e.g. parking. Actively cooling the electric motor may further reduce a risk of failure of the electric motor (e.g. due to overheating), thus improving overall safety of the power steering system.

The inventors have found that conventional electric power steering systems which are capable of delivering high levels of mechanical power are usually large and heavy, which makes them difficult to incorporate into smaller vehicles, or into vehicles where weight is a concern (e.g. motorsport vehicles). However, the inventors have realised that by actively cooling the electric motor using forced air cooling, a size of the electric motor can be reduced compared to systems where no active cooling is used. This is because a smaller, actively cooled electric motor can be used to achieve similar levels of mechanical power to a larger, uncooled electric motor. Thus, the invention enables a size and weight of electric power steering systems to be reduced, whilst still enabling high levels of mechanical power to be provided for steering the vehicle.

According to the first aspect of the invention, there is provided an electric power steering system for a vehicle, the power steering system comprising: an electric motor configured to provide mechanical power to a steering mechanism of the vehicle for steering the vehicle; a housing in which the electric motor is disposed, wherein an air flow path is defined within the housing; and an air flow source arranged to generate an air flow along the air flow path to cool the electric motor, wherein the air flow source is independent from the electric motor.

By disposing the electric motor in a housing in which an air flow path is defined, it is possible to efficiently remove heat from the electric motor by generating an air flow along the air flow path. In particular, this arrangement may enable a well-controlled air flow to flow through the housing and be guided around the electric motor, to enable even, continuous and reliable cooling of the electric motor. As a result, it may be possible to avoid excessive heating of the electric motor, even when the electric motor is used to provide high levels of mechanical power to the steering system.

The electric motor may include any suitable electric motor for providing mechanical power to the steering mechanism of the vehicle. For example, the electric motor may include a brushless DC motor, however other types of electric motor may also be used. The electric motor may include a stator and a rotor, as well as a casing disposed around the stator and rotor.

The electric motor is configured to provide mechanical power to a steering mechanism of the vehicle for steering the vehicle. Thus, the mechanical power provided by the electric motor may serve to assist steering of the vehicle. Where the vehicle is an autonomous vehicle, the mechanical power provided by the electric motor may serve to steer the vehicle.

The mechanical power provided by the electric motor may be in the form of a torque or a force applied by the electric motor. For example, the electric motor may be configured to apply a torque to a shaft, such as a steering column of the vehicle. Thus, in one embodiment, the electric motor may be configured to apply a torque to a steering column of the vehicle.

Herein, the steering mechanism of the vehicle may refer any part of an assembly in the vehicle which serves to turn the wheels in order to steer the vehicle. For example, the steering mechanism may include any of a steering wheel, a steering column, a steering shaft, a steering rack, or any other shaft, gear, rack or pinion connected between the steering wheel and the steering rack.

The power steering system may include a transmission for coupling the electric motor to the steering mechanism. In this manner, mechanical power generated by the electric motor may be effectively transmitted to the steering mechanism. For example, such a transmission may be in the form of a gear assembly which is configured to couple the electric motor to the steering mechanism. In one embodiment, the transmission may include a gear assembly configured to transfer a torque generated by the electric motor to the steering mechanism. Alternatively, the electric motor may be configured to be directly coupled to the steering mechanism. As an example, a rotor of the electric motor may be directly connected to the steering mechanism, e.g. a rotor of the electric motor may be coaxial with a steering column, in order to directly apply a force or a torque to the steering mechanism.

The housing may form an enclosure around all or part of the electric motor. The housing serves to define the air flow path which is used to cool the electric motor. The air flow path may be defined at least in part by the housing, e.g. the air flow path may be defined in part by a wall of the housing. Parts of the air flow path may also be defined by other components. For example, the air flow path may be defined in part by the electric motor itself. As the air flow path is defined within the housing (in which the electric motor is disposed), the air flow path may pass in close proximity to, or even come into contact with, the electric motor, so that heat from the electric motor may be effectively removed by air flowing along the air flow path. In particular, the air flow path may channel air flow within the housing, in order to enable effective heat removal from the electric motor.

The air flow path may come into contact with the electric motor, and/or come into contact with a surface in the housing that is thermally coupled to the electric motor. In this manner, heat may be effectively removed from the electric motor by air flowing along the air flow path.

The air flow path may be arranged to maximise a cooling efficiency of the electric motor. This may be achieved in various ways, e.g. by designing the air flow path to maximise an area across which heat is exchanged between the electric motor and air flowing along the air flow path, and/or by directing air flow towards areas of high heat generation. In some cases the air flow path may be arranged to accelerate air flowing along the air flow path, which may further improve cooling efficiency of the electric motor. For example, the air flow path may include one or more channels that are arranged to accelerate air flowing along the air flow path.

In some cases, multiple air flow paths may be defined within the housing, and the air flow source may be arranged to cause an air flow along each of the air flow paths. The use of multiple air flow paths may further enhance cooling efficiency of the electric motor.

The housing may be made of any suitable material. In some embodiments, the housing may be made of a thermally conductive material. This may enable the housing to dissipate heat generated by the electric motor, thus further improving cooling efficiency of the electric motor. For example, the housing may be made of a metal material, such as brass, aluminium, or steel. However, other types of materials may also be used, such as various plastics.

In some cases, the housing may be formed of multiple parts, all of which are made from aluminium. Alternatively, an inner part of the housing closer to the electric motor may be made of aluminium (e.g. to provide better thermal conductivity and heat dissipation), whilst an outer part of the housing may be made of a plastic material (which may be more lightweight). Where the housing is made as a single part, it may be made entirely of aluminium, e.g. it may be cast or 3D printed as a single piece.

The air flow source serves to generate an air flow along the air flow path. Any suitable air flow source may be used. As an example, the air flow source may include a fan which is arranged to generate an air flow along the air flow path. For example, a fan may be arranged at an inlet and/or an outlet of the air flow path, in order to cause air to flow along the air flow path. As another example, the air flow source may include a compressed air source (such as a compressed air tank) which is connected to an inlet of the air flow path. Then, air may be released from the compressed air source, to cause an air flow along the air flow path. In some cases, the air flow source can be provided by part of the vehicle, such as an engine fan of the vehicle, or an air inlet of the vehicle. The air flow source may be selected for compatibility with an air pressure change experienced by air flowing along the air flow path.

The air flow source being independent from the electric motor may mean that the air flow source is not driven or otherwise powered by the electric motor. Thus, the air flow source may be operated independently from the electric motor. For example, where the air flow source comprises a fan, the fan may be driven by a motor which is separate from the electric motor. As another example, where the air flow source comprises a compressed air source, opening and closing of the compressed air source may be controlled by an actuator, which is separate from the electric motor (i.e. it is not driven by the electric motor).

As the air flow source is independent from the electric motor, the air flow source may be used to cool the electric motor even when the electric motor is not in active use (e.g. while the vehicle is stopped, or a steering angle is constant). Thus, a cooling power which is achieved with the air flow source does not depend on a current state of the motor, which may ensure that the electric motor can be continuously and effectively cooled. Additionally, by making the air flow source independent from the electric motor, this may avoid draining power from the electric motor and reducing a torque which it can apply to the steering mechanism. As the air flow source is independent from the electric motor, the air flow source need not be mechanically coupled to the electric motor, which may facilitate construction of the power steering system, and enable the air flow source to be positioned in a manner which will optimise cooling efficiency.

Additionally, the air flow source may be independent from a drive system of the vehicle. In other words, the air flow source may be independent from a drive (or traction) motor of the vehicle, i.e. a motor which is configured to drive the wheels of the vehicle.

Thus, the air flow source may be operated independently from the drive system of the vehicle. As a result, a cooling power provided by the air flow source may not depend on a speed at which the vehicle is traveling, which may enable more effective cooling of the electric motor. So, similarly to above, where the air flow source comprises a fan, the fan may be driven by a motor which is separate from drive system of the vehicle. The fan may be driven by a dedicated motor, e.g. a motor which is operable independently from other vehicle systems. Where the air flow source comprises a compressed air source, opening and closing of the compressed air source may be controlled by an actuator which is separate from the drive system of the vehicle (e.g. it is not driven by any part of the drive system). The actuator may be a dedicated actuator, i.e. an actuator which is operable independently from other vehicle systems.

The air flow source may be an independent (or a dedicated) air flow source. In other words, the air flow source may be operated independently from the electric motor and from any other system in the vehicle (e.g. such as a drive system). For example, the air flow source may be driven and/or powered independently from the electric motor and the drive system of the vehicle. In particular, the air flow source may comprise a dedicated motor and/or actuator, which is driven independently from the electric motor and from any other system in the vehicle.

The power steering system may include further components, such as a torque sensor and a control unit. The torque sensor may be configured to detect a torque applied to a steering wheel of the vehicle and output a signal indicative of the detected torque. The control unit may be configured to, based on the output signal from the torque sensor, determine a torque to be provided by the electric motor to the steering mechanism, and transmit a control signal to the electric motor to cause the electric motor to provide the determined torque to the steering mechanism. The control unit may be in the form of any suitable computing device which is communicatively coupled to the torque sensor and the electric motor, and which is provided with suitable software for performing the required steps. Where the electric motor is configured to apply a torque to a shaft, the control unit may be configured to determine a torque to be applied by the electric motor to the shaft, and to transmit a corresponding control signal to cause the electric motor to deliver the determined torque. The control unit may also be configured to control the air flow source, e.g. to control a speed of the air flow generated by the air flow source.

The power steering system may include a controller for controlling the electric motor. The controller may include a power inverter and any other electronics required for powering and controlling the electric motor. In such a case, the control signal transmitted by the control unit may be transmitted to the controller, which then controls the electric motor based on the received control signal.

Herein, the electric motor and the housing may together be referred to as an electric motor assembly. Where the power steering system includes a controller for controlling the electric motor, the controller may be part of the electric motor assembly.

The housing may be thermally coupled to the electric motor. In this manner, heat generated by the electric motor may be transferred to the housing, such that the housing may act as a heat sink for the electric motor (particularly when the housing is made of a thermally conductive material). This may improve cooling efficiency of the electric motor. Additionally, the housing may provide a large surface area with which air flowing along the air flow path in the housing may come into contact, so that heat can effectively be removed by air flowing along the air flow path.

The housing may be thermally coupled to the electric motor via any suitable means. For example, one or more thermal links may be provided between the housing and the electric motor. The thermal links may, for example, be in the form of a thermally conductive paste or epoxy between the housing and the electric motor, in the form of a thermally conductive pad, and/or in the form of one or more bolts (or other fasteners) which are used to secure the housing to the electric motor. The thermal links may be arranged to enable efficient thermal conduction between the housing and a region of high heat dissipation from the electric motor. For example, the thermal links may be arranged to enable efficient thermal conduction between the housing and a stator of the electric motor and, in particular, an end turn of a stator of the electric motor. In some cases, the housing may be integrally formed with a casing of the electric motor, e.g. the housing and the casing of the electric motor may permanently bonded together or otherwise formed as a single part. This may enhance heat transfer from the electric motor to the housing.

The housing may comprise an inner housing in which the electric motor is disposed, and an outer housing disposed around the inner housing, and wherein the air flow path is defined at least in part by a gap between the inner housing and the outer housing. Thus, the air flow source may cause air to flow through the gap between the inner housing and the outer housing, in order to remove heat from the electric motor. Heat from the electric motor may be transferred to the inner housing, which is then cooled by the air flow along the air flow path. Such a double-layer housing may result in a layer of rapidly flowing air (or air "jacket") being established around at least part of the inner housing, which results in highly efficient heat removal due to the large area available for heat exchange and the rapid flow of air. In particular, the gap between the inner housing and the outer housing may act as a channel which promotes rapid and controlled air flow around the inner housing. Heat from the electric motor may be transferred to the outer housing via the inner housing. For example, a number of thermal conduction paths between the inner and outer housing may be provided to facilitate heat transfer from the electric motor to the outer housing via the inner housing.

The inner housing and the outer housing may be provided as separate parts which are secured together. Alternatively, the inner housing and the outer housing may be formed integrally as a single part. In such a case, the inner housing and the outer housing may correspond to an inner wall and an outer wall of the housing, respectively.

The inner housing and the outer housing may both be made of a thermally conductive material, to improve cooling efficiency of the electric motor. Alternatively the inner housing may be made of a thermally conductive material and the outer housing may be made of a different material. The material of the outer housing need not necessarily be a thermally conductive material. For example, the material of the outer housing may be a lightweight material (e.g. lighter than the material of the inner housing), such as a plastic material. In this manner, the inner housing may effectively dissipate heat from the electric motor, whilst an overall weight of the power steering system may be reduced. Moreover, the electric motor may be thermally coupled to the inner housing, so that heat from the electric motor can be efficiently transferred to the inner housing and subsequently the air flow path.

In some embodiments, the air flow path may be defined at least in part by a channel formed in a wall of the housing. In other words, a channel (or gallery) may defined within the wall of the housing, such that air may flow within the wall of the housing. This may enable heat to be efficiently removed from the housing, and thus from the electric motor.

The air flow path may be defined at least in part by a surface of the electric motor. In this manner, air flowing along the air flow path may come directly into contact with the electric motor, to promote efficient cooling of the electric motor. For example, the air flow path may pass along part of an outer surface of the electric motor, e.g. the air flow path may pass along an outer surface of a casing or a stator of the electric motor. In such a case, the outer surface of the electric motor may include one or more channels for guiding the air flow.

In some cases, the air flow path may pass through the electric motor, which may enable internal components of the electric motor to be directly cooled by the air flow. Thus, the air flow path may be defined at least in part by an internal surface of the electric motor. As an example, the casing of the electric motor may include one or more openings through which the air flow can pass.

The air flow path may be defined at least in part by a gap between a rotor and a stator of the electric motor. This may enable direct and efficient cooling of the internal components of the electric motor, which may minimise heating of the electric motor. This may be achieved, for example, by providing an inlet hole and an outlet hole in the casing of the electric motor, the inlet hole and the outlet hole being arranged such that air flowing along the air flow path between the inlet hole and the outlet hole passes through the gap between the rotor and the stator.

The air flow path may extend around at least part of a circumference of the electric motor. This may improve a cooling efficiency of the electric motor, as the air flow may effectively remove heat from around all or part of the circumference of the electric motor. In particular, this may enable a layer of cooling air to flow around the at least part of the circumference of the electric motor, to cool the electric motor. This may also facilitate efficient cooling of the electric motor as the air flow may be incident on the electric motor from more than one direction. In some cases, the air flow path may extend around the entire circumference of the electric motor, to further improve cooling efficiency of the electric motor.

The air flow path may have multiple branches (or sections), which are arranged to cool different parts of the electric motor. For example, a first branch of the air flow path may extend around a first part of the circumference of the electric motor, and a second branch of the air flow path may extend around a second part of the circumference of the electric motor.

The electric motor may have a generally cylindrical shape. Then, the air flow path may curve around the at least part of the circumference of the electric motor.

The housing may include a plurality of fins for guiding air flow along the air flow path. The fins may serve to define channels which guide air flowing along the air flow path. The channels defined by the fins may guide air flowing along the air flow path to provide a desired distribution of cooling across a dimension of the air flow path. For example, the fins may be designed to achieve an even, normal, or biased distribution of cooling across a width of the air flow path. As another example, the fins may comprise a flow deflector designed to direct the air flow to a targeted region of the electric motor, e.g. a region prone to overheating, which may facilitate efficient heat removal. The fins may cause air flowing along the air flow path to be accelerated, and/or increase a turbulence of the air flowing along the air flow path, which may further improve cooling efficiency. The fins may comprise a turbulator to increase a turbulence of the air flowing along the air flow path. Further, the fins may be designed to minimise an air pressure loss experienced by the air flowing along the air flow path. Minimising an air pressure loss experienced by the air flowing along the air flow path may increase a speed of the air flowing along the air flow path, and thus increase a rate of heat transfer away from the electric motor. Additionally, the fins may increase a surface area of the housing, thus increasing a rate of heat exchange between the housing and the air flowing along the air flow path, which may in turn improve cooling efficiency of the power steering system. The fins may comprise any features on a wall of the housing which serve to increase the surface area of the wall, such as ridges, bumps and surface texture. The fins may, for example, be in the form of corrugations on a wall of the housing. Additionally or alternatively, the fins may be in the form of pin fins, which may resemble narrow rods projecting from a wall of the housing. Where the inner housing and the outer housing are formed integrally as a single part, the fins may comprise a lattice structure between the inner housing and the outer housing. A lattice structure may increase a surface area of the housing without significantly reducing a speed of the air flowing along the air flow path, thus improving a cooling efficiency of the power steering system.

The fins in the housing may serve to define part of the air flow path. For example, the fins may be formed on a wall of the housing, e.g. an inner wall of the housing. Where the air flow path extends around at least part of the circumference of the electric motor, the fins in the housing may be arranged to extend around the at least part of the circumference of the electric motor.

Where the housing includes an inner housing and an outer housing, the fins may be disposed on one or both of the inner housing and the outer housing, such that the fins are arranged in the gap between the inner housing and the outer housing. For example, the fins may be on an outer surface of the inner housing, and/or on an inner surface of the outer housing. Thus, the fins may define a series of channels in the gap between the inner housing and the outer housing, to further control the flow of air along the air flow path.

The air flow source may comprise a fan that is mounted on the housing. In this manner, the air flow source may be directly integrated with the housing, to provide a compact and easy-to-install unit. In particular, this may simplify construction and installation of the power steering system in a vehicle, as this may avoid having to connect the housing to a remote air flow source. Mounting the fan directly on the housing may also ensure that a high air flow rate can be provided to the air flow path in the housing, so that the electric motor can be effectively cooled. The fan may be mounted to the housing using any suitable means, e.g. via suitable fasteners and/or an adhesive. In some cases, the fan may be directly integrated into the housing, e.g. it may be provided as part of the housing.

The housing may include an air inlet and an air outlet, such that the air flow path extends between the air inlet and the air outlet. In this manner, air from the air flow source may flow into the air inlet in the housing, along the air flow path, and then exit the housing via the air outlet in the housing. The air flow path may be defined in the housing between the air inlet and the air outlet. The air flow source may be connected to the air inlet, to cause air to flow into the air flow path through the air inlet. Where the air flow source includes a fan mounted on the housing, the fan may be mounted at the air inlet or at the air outlet, in order to generate an air flow along the air flow path. In some cases, a fan may be mounted at both the air inlet and at the air outlet, to generate an air flow along the air flow path.

The air inlet and the air outlet may be arranged on opposite sides of the housing relative one another. Thus, cool air may flow into the housing via the air inlet on one side of the housing, and exit the housing via the air outlet on the opposite side of the housing. This may facilitate effective evacuation of hot air from the housing, as well as promote rapid air flow within the housing (as the air flow along the air flow path may all be in the same general direction). In particular, this may avoid hot air from being circulated within the housing. The air inlet and the air outlet may be disposed near opposite sides of the electric motor.

The power steering system may further comprise an air filter arranged at the air inlet and/or at the air outlet. This may serve to avoid dust, dirt, and other debris, as well as moisture, from entering the housing and the air flow path. This may avoid blockages in the air flow path, in order to ensure that cooling efficiency of the electric motor can be maintained during operation of the power steering system. This may also protect the electric motor from dust, dirt, and other debris, as well as moisture, which might otherwise cause damage to the electric motor or reduce its performance. For example, where the air flow source comprises a fan mounted on the housing, the air filter may be arranged to prevent dust, dirt, and other debris from being aspirated into the air flow path in the housing by the fan. Where the air flow source comprises a fan, the filter may be arranged to protect the fan from dust, dirt and other debris. Such ingress may damage or jam the fan, reducing the air flow generated by the fan. As an example, the filter may be arranged over an external face of a case that encloses an impeller or blade of the fan to avoid dust, dirt and other debris entering the fan. Any suitable type of filter for capturing or rejecting dust, dirt and other debris, and optionally moisture, may be used as the air filter.

The use of an air filter at the air inlet and/or the air outlet may be particularly beneficial where the air flow path is defined in part by a surface of the electric motor, and or where the air flow path passes through the electric motor (e.g. through a gap between the rotor and the stator of the electric motor), as this may enable effective cooling of the electric motor whilst minimising a risk of damage to the electric motor.

As mentioned above, the power steering system may include a controller configured to control the electric motor. In such a case, the air flow source may be further configured to cool the controller. In this manner, both the electric motor and the controller may be cooled by the air flow source. In this manner, a single air flow source may be used to cool the controller and the electric motor, which may reduce a size and complexity of the power steering system. Typically, the controller may comprise a power inverter for supplying power to the electric motor, as well as control electronics for controlling operation of the electric motor. As a result, the controller may heat up during operation, particularly when it delivers high power levels to the electric motor. Cooling the controller using the air flow source may ensure that the controller does not overheat during operation, thus improving reliability of the controller and therefore of power steering system as a whole.

The controller may be disposed in the housing. Thus, a single housing may be used to house both the electric motor and the controller. By disposing the controller in the housing, air flowing along the air flow path in the housing may act to cool the controller as well as the electric motor, thus providing efficient cooling of both components. In particular, when the controller is disposed in the housing, the controller may benefit from the various improvements in cooling efficiency discussed above in relation to the electric motor. Any of the features discussed herein for improving cooling efficiency of the electric motor may be adapted to improve cooling efficiency of the controller.

The electric motor may be disposed in a first part of the housing and the controller may be disposed in a second part of the housing; a first air flow path may be defined in the first part of the housing, and a second air flow path may be defined in the second part of the housing; and the air flow source may be arranged to generate an air flow along the first and second air flow paths to cool the electric motor and the controller, respectively. Thus, separate air flow paths are defined within the housing for cooling the electric motor and the controller. This may minimise transfer of heat between the electric motor and the controller via air flowing within the housing, such that a cooling efficiency for the electric motor and the controller may be improved.

The first air flow path may be arranged to remove heat generated by the electric motor, whilst the second air flow path may be arranged to remove heat generated by the controller. For example, the first air flow path may extend along at least part of a circumference of the electric motor, and the second air flow path may extend along at least part of a side of the controller. The first air flow path and the second air flow path may include overlapping portions, i.e. they may have portions in common.

The first part of the housing and the second part of the housing may correspond to compartments of the housing in which the electric motor and the controller are disposed, respectively.

The housing may include a first plurality of fins arranged to guide air flow along the first air flow path, and a second plurality of fins arranged to guide an air flow along the second air flow path.

The housing may include an air inlet, a first air outlet and a second air outlet; the first air flow path may extend between the air inlet and the first air outlet; and the second air flow path may extend between the air inlet and the second air outlet. Thus, both the first air flow path and the second air flow path may share a common air inlet, but have separate air outlets. This may facilitate generating an air flow along the first and second air flow paths, as the air flow source may be connected to a single air inlet. However, providing separate air outlets may serve to ensure that hot air from the first air flow path does not enter the second air flow path (and vice versa), thus improving cooling efficiency of the electric motor and the controller. As an example, a single fan may be provided at the air inlet to generate an air flow along both air flow paths. Of course, fans may additionally or alternatively be provided at the first air outlet and the second air outlet.

Where the housing includes a plurality of fins, a height of one or more of the plurality of fins may be smaller in a vicinity of the air inlet compared to a height of the one or more of the plurality of fins in a region away from the air inlet. Reducing a height of the fins in the vicinity of the air inlet may ensure that air can enter all of the channels defined by the fins, thus promoting uniform air flow along the air flow path. This may also promote distribution of air flow between the first air flow path and the second air flow path, so that adequate air flow can be achieved along both air flow paths, thus providing efficient cooling for both the electric motor and the controller.

In embodiments where a common air flow path in the housing is used for cooling both the controller and the electric motor, the controller and the electric motor may be arranged on opposite sides of the air flow path, such that the controller and the electric motor are cooled when the air flow source generates the air flow along the air flow path. For example, the air flow path may pass between the controller and the electric motor, such that the controller and the electric motor are arranged on opposite sides of the air flow path. This may enable efficient cooling of both the controller and the electric motor, and provide for a simplified construction of the housing (e.g. as only a single air flow path may be needed).

Where a common air flow path in the housing is used for cooling both the controller and the electric motor, the controller may be disposed either inside or outside the housing. Where the controller is disposed inside the housing with the electric motor, the air flow path may be arranged so that it passes between the controller and the electric motor. Where the controller is disposed outside the housing, the housing may be made of a thermally conductive material and the controller may be mounted on an outer surface of the housing. Then, heat generated by the controller may be transferred to the housing, which may in turn be cooled by air flowing along the air flow path in the housing.

The power steering system may further comprise a temperature sensor configured to detect a temperature of the electric motor, and the power steering system may be configured to control the air flow source based on an output from the temperature sensor. In this manner, the power steering system may automatically control the air flow source based on the current temperature of the electric motor, in order to ensure that the electric motor does not overheat. Thus, the electric motor may be kept at a suitable working temperature during operation, improving reliability of the power steering system. This may also serve to improve a power efficiency of the power steering system, as the operation of the air flow source may be dynamically adapted based on the temperature of the electric motor, rather than being operated at a constant level. As an example, the power steering system may be configured to control the air flow source to increase the air flow rate when a temperature of the electric motor increases. Conversely, the air flow rate may be reduced (or the air flow may be switched off altogether) when the temperature of the electric motor is below a predetermined threshold.

Where the air flow source is configured to cool a controller of the power steering system, the power steering system may further comprise a temperature sensor configured to detect a temperature of the controller, and the power steering system may be configured to control the air flow source based on an output from the temperature sensor. In this manner, the power steering system may automatically control the air flow source based on the current temperature of the controller, in order to ensure that the controller does not overheat. Similar principles to those discussed above in relation to control of the air flow source based on the temperature of the electric motor may be used for controlling the air flow source based on the temperature of the controller. The temperature sensor configured to detect a temperature of the controller may be provided in addition to, or alternatively to, the temperature sensor configured to detect a temperature of the electric motor mentioned above.

Where the air flow source includes a fan, controlling the air flow source may involve controlling a speed of the fan. Where the air flow source includes a compressed air source or an air inlet of the vehicle, controlling the air flow source may involve controlling a valve associated with the compressed air source or air inlet respectively, in order to control an air flow rate.

The power steering system may employ a suitable temperature control algorithm for controlling the air flow source based on the output from the temperature sensor, e.g. in order to maintain the temperature of the electric motor below a predetermined threshold. For example, the power steering system may employ a PID-type control. Control of the air flow source may be implemented with the control unit of the power steering system mentioned above.

In some embodiments, the electric motor may comprise a first electric motor and a second electric motor, both the first electric motor and the second electric motor being disposed in the housing and configured to respectively apply a torque to a common shaft for steering the vehicle, and wherein the air flow source is configured to cool the first electric motor and the second electric motor. Thus, air flowing along the air flow path in the housing may cool both the first and second electric motors. The common shaft may be a steering mechanism of the vehicle, as referred to above. For example, the common shaft may be a steering column of the vehicle. In some cases, the first shaft may be coupled to a steering mechanism of the vehicle, e.g. via a transmission.

Providing two electric motors which are both configured to apply a torque to a common shaft for steering the vehicle may improve a reliability and safety of the power steering system. In particular, this may ensure that, in case of failure of one of the electric motors, the other may still be used to apply a torque to the shaft, which may avoid sudden loss of steering assistance. Additionally, the use of two electric motors may increase a total torque that can be provided by the power steering system. By arranging both electric motors within the same housing, the power steering system may be made more compact, whilst enabling efficient cooling of both electric motors.

The first electric motor and the second electric motor may be configured as described below in relation to the second aspect of the invention. In particular, the first electric motor and the second electric motor may be coupled to the shaft such that a cogging torque exerted by the first electric motor on the shaft at least partially cancels a cogging torque exerted by the second electric motor on the shaft.

The power steering system may include a first controller for controlling the first electric motor and a second controller for controlling the second electric motor. Similarly to the discussion above, both the first controller and the second controller may be arranged within the housing, so that they may also be cooled by the air flow within the housing.

In a second aspect of the invention, there is provided an electric power steering system. At its most general, the second aspect of the invention provides an electric power steering system comprising a first electric motor and a second electric motor, both of which are coupled to a shaft and configured to apply a torque to the shaft, where the first electric motor and the second electric motor are coupled to the shaft in a manner that minimises (or reduces) a cogging torque exerted on the shaft by the two electric motors relative to a cogging torque exerted on the shaft by one of the electric motors.

Cogging torque is an effect which occurs in permanent magnet electric motors, such as brushed and brushless DC motors. Cogging torque in an electric motor is due to the magnetic interaction between the permanent magnets of the electric motor's rotor and the teeth of the electric motor's stator (the teeth typically being made of, or comprising, steel). More specifically, poles of the permanent magnets of the rotor may be attracted by the teeth of the stator, such that the poles of the permanent magnets may naturally align themselves with the teeth of the stator. As a result, a torque (referred to as the cogging torque) is required to overcome the attraction between the permanent magnets of the rotor and the steel teeth of the stator. The cogging torque depends on an angular position of the rotor relative to the stator, and the periodicity of the cogging torque depends on the number of magnetic poles in the rotor and the number of teeth in the stator. Cogging torque in an electric motor may prevent the rotor from being smoothly rotated relative to the stator (e.g. requiring a constant torque or maintaining a constant speed). Where the electric motor is used in a power steering system, cogging torque may result in a jerkiness which may be perceived by the user when turning the steering wheel. Additionally, issues associated with cogging torque may typically be exacerbated in power steering systems that employ multiple electric motors, as the cogging torques of each electric motor may add up to produce a large overall cogging torque.

The second aspect of the invention addresses issues associated with cogging torque in electric power steering systems, by using two electric motors which are coupled to a shaft in a manner that minimises a cogging torque exerted on the shaft by the two electric motors. In particular, the two electric motors may be coupled to the shaft so that a cogging torque exerted on the shaft by the first electric motor at least partially cancels a cogging torque exerted on the shaft by the second electric motor. Thus, the cogging torque exerted on the shaft may be effectively minimised, without having to make any modifications to the electric motors themselves. Minimising (or in some cases completely cancelling) the cogging torque in this manner may result in a much smoother and more responsive steering experience for the driver. Known techniques for reducing cogging torque, such as skewing the stator or rotor, involve physical changes to the electric motor itself, which often result in a reduced performance of the electric motor, such that a larger electric motor is required to achieve the desired performance.

Moreover, using two electric motors in the power steering system may improve a reliability and safety of the power steering system. In particular, this may ensure that, in case of failure of one of the electric motors, the other may still be used to apply a torque to the shaft, which may avoid sudden loss of power steering. Thus, the second aspect of the invention enables improvements in reliability and safety of electric power steering systems, without the drawback of increased cogging torque that might otherwise result from using multiple electric motors.

So, according to a second aspect of the invention, there is provided an electric power steering system for a vehicle, the power steering system comprising: a first electric motor coupled to a shaft; a second electric motor coupled to the shaft; wherein the first electric motor and the second electric motor are coupled to the shaft such that a cogging torque exerted by the first electric motor on the shaft at least partially cancels a cogging torque exerted by the second electric motor on the shaft; and wherein the power steering system is configured to control the first electric motor and the second electric motor to each apply a respective torque to the shaft for steering the vehicle during operation of the vehicle.

Any features described above in relation to the first aspect of the invention may be shared with the second aspect of the invention. In particular, techniques in the first aspect of the invention for cooling the electric motor may be applied in the second aspect of the invention for cooling the first and second electric motors. Similarly, any features described in relation to the second aspect of the invention may be shared with the first aspect of the invention.

The first electric motor and the second electric motor are coupled to the same shaft. The first electric motor and the second electric motor may each be configured to apply a respective torque to the shaft. So, together, the first and second electric motors may apply a combined torque to the shaft, which corresponds to the sum of the torques respectively applied by the first and second electric motors.

A rotor of the first electric motor may be coupled to the shaft, and a rotor of the second electric motor may be coupled to the shaft. For example, the shaft may be connected to the rotors of the first and second electric motor. In this manner, the first and second electric motors may effectively apply a torque to the shaft.

The first and second electric motors may be any suitable type of electric motor, such as a brushless DC motor, however other types of electric motor may also be used. The first and second electric motors may be identical, e.g. they may both have the same specifications. In particular, a rotor of the first electric motor may have a same number of magnetic poles as a rotor of the second electric motor, and a stator of the first electric motor may have a same number of teeth as a stator of the second electric motor. However, in some cases, electric motors having different specifications may be used.

The shaft may be configured to be coupled to a steering mechanism of the vehicle. For example the shaft may be coupled to a steering column or a steering rack of the vehicle, e.g. via a suitable transmission. In this manner, the combined torque applied to the shaft by the first and second electric motors may be transferred to the steering mechanism of the vehicle, in order to assist and/or perform steering of the vehicle.

As discussed above, the first electric motor and the second electric motor are coupled to the shaft such that the cogging torque exerted by the first electric motor on the shaft at least partially cancels the cogging torque exerted by the second electric motor on the shaft. In this manner, the torques applied by the first and second electric motors may cause substantially smooth rotation of the shaft, due to the at least partial cancellation of the cogging torque. As a result, the power steering system may provide smooth and responsive steering of the vehicle, thus improving a driving experience of the vehicle. The first and second electric motors can be coupled to the shaft in various different manners, in order to achieve at least partial cancellation of the cogging torque, as discussed below.

In some cases, the cogging torque exerted by the first electric motor on the shaft may cancel (e.g. substantially cancel) the cogging torque exerted by the second electric motor on the shaft.

The power steering system is configured to control the first and second electric motors to cause them to apply respective torques to the shaft in order to steer the vehicle. Thus, both electric motors may be used to simultaneously apply a respective torque to the shaft to steer the vehicle. Additionally, the power steering system may control how much torque is applied to the shaft by each electric motor. Using both electric motors to apply a torque to the shaft to steer the vehicle may enable a larger overall torque to be applied to the shaft. This may also avoid having to operate one of the electric motors beyond its rating, by distributing the torque applied to the shaft across the two electric motors. In this manner, overheating of the electrical motors may be avoided, and a wear on each electric motor may be reduced, such that a reliability of the power steering system may be improved.

The power steering system may comprise a control unit configured to control the first electric motor and the second electric motor. The control unit may be similar to the control unit discussed above in relation to the first aspect of the invention. The control unit may be communicatively coupled to the first electric motor and the second electric motor, so that the control unit can transmit control signals to the first electric motor and the second electric motor for controlling the torques applied by the first and second electric motors. The control unit may be configured to perform any of the steps discussed below involving control of the electric motors.

Similarly to the power steering system of the first aspect of the invention, the power steering system of the second aspect of the invention may include a torque sensor. The torque sensor may be configured to detect a torque applied to a steering wheel of the vehicle and output a signal indicative of the detected torque. The control unit may be configured to, based on the output signal from the torque sensor, determine a respective torque to be applied by each of the first electric motor and the second electric motor to the shaft, and transmit a respective control signal to each of the first electric motor and second electric motor to cause the first electric motor and the second electric motor to apply the respective torques to the shaft.

The power steering system may include a first controller for controlling the first electric motor and a second controller for controlling the second electric motor. The controllers may each include a power inverter and any other electronics required for powering and controlling the electric motor. In such a case, the control signals transmitted by the control unit may be transmitted to the respective controllers, which then control the electric motors based on the received control signals.

A first magnetic field generated by either a stator or a rotor in the first electric motor may be out of phase with a corresponding second magnetic field in the second electric motor. This may enable the cogging torque exerted by the first electric motor on the shaft to at least partially cancel the cogging torque exerted by the second electric motor on the shaft. In particular, by making the first magnetic field in the first electric motor out of phase with the second magnetic field in the second electric motor, the rotor in the first electric motor may experience high cogging torque at different angular positions compared to the rotor in the second electric motor, leading to at least partial cancellation of the cogging torque in both electric motors.

As an example, the first magnetic field in the first electric motor may correspond to a magnetic field produced by permanent magnets of the rotor of the first electric motor, and the second magnetic field in the second electric motor may correspond to a magnetic field produced by permanent magnets of the rotor of the second electric motor. Poles of the permanent magnets of the rotor of the first electric motor may be arranged at different angular positions relative to the poles of the permanent magnets of the rotor of the second electric motor, in order to produce first and second magnetic fields which are out of phase with one another. In other words, magnetic poles of the rotor of the first electric motor may be angularly shifted (or offset) relative to magnetic poles of the rotor of the second electric motor. The rotors of the first and second electric motors may both be connected to the shaft, such that their relative angular positions remain fixed.

Alternatively, the first magnetic field in the first electric motor may correspond to a magnetic field produced by coils in the stator of the first electric motor, and the second magnetic field in the second electric motor may correspond to a magnetic field produced by coils in the stator of the second electric motor. The coils in the stator of the first electric motor may be at different angular positions relative to the coils in the stator of the second electric motor, in order to produce first and second magnetic fields which are out of phase with one another. In other words, the coils in the stator of the first electric motor and the coils in the stator of the second electric motor may be angularly shifted (or offset) relative to one another.

Herein, an angular position may refer to an angular position about a longitudinal axis of the shaft.

Herein, the first magnetic field and the second magnetic field being out of phase with one another may refer to a peak of the first magnetic field being at a different angular position compared to a peak of the second magnetic field.

The first magnetic field in the first electric motor may be out of phase with the second magnetic field in the second electric motor by a quarter of a magnetic field cycle.

This may ensure that the cogging torque of the first electric motor and the second electric motor substantially cancel each other out, such that there may be a reduced net cogging torque exerted on the shaft. This may greatly improve a smoothness with which the shaft can be rotated by the electric motors which may also improve a smoothness with which the steering mechanism can be operated by the driver of the vehicle. The magnetic cycle may correspond to a magnetic cycle of the first and/or second electric motor.

Herein, a magnetic cycle may correspond to a mechanical cycle of an electric motor (i.e. one revolution of the rotor) divided by the number of magnetic pole pairs in the rotor. In other words, the magnetic cycle may correspond to a period of the relevant magnetic field.

The first electric motor and the second electric motor may be configured to apply a combined torque to the shaft, and the power steering system may be configured to control, for each of the first electric motor and the second electric motor, a proportion of the combined torque that is applied by that electric motor. In this manner, the power steering system can control the proportion of the total combined torque that is provided by each of the electric motors. This may facilitate distributing a torque load across the two electric motors, as well as enable performance of the power steering system to be optimised, e.g. by controlling the proportions applied by the electric motors based on their performance.

The power steering system may comprise a first temperature sensor configured to detect a temperature of the first electric motor, and a second temperature sensor configured to detect a temperature of the second electric motor; and the power steering system may be configured to adjust, for each of the first electric motor and the second motor, the proportion of the combined torque applied by that electric motor, based on outputs from the first temperature sensor and the second temperature sensor. In this manner, the power steering system may take into account the temperatures of the first and second electric motors when determining the proportions of the combined torque to be applied by the first and second electric motors. This may facilitate avoiding overheating of the electric motors, by dynamically adjusting the torques applied by the electric motors based on their temperatures. For example, if one of the electric motors starts overheating, the proportion of the combined torque applied by that electric motor may be reduced (and the proportion applied by the other electric motor may be increased).

Where the power steering system comprises a first controller and a second controller, the power steering system may comprise a third temperature sensor configured to detect a temperature of the first controller, and a fourth temperature sensor configured to detect a temperature of the second controller; and the power steering system may be configured to adjust, for each of the first electric motor and the second motor, the proportion of the combined torque applied by that electric motor, based on outputs from the third temperature sensor and the fourth temperature sensor. In this manner, the power steering system may take into account the temperatures of the first and second controllers when determining the proportions of the combined torque to be applied by the first and second electric motors. This may facilitate avoiding overheating of the controllers, by dynamically adjusting a power that is delivered to each controller based on their respective temperatures. For example, if one of the controllers starts overheating, the proportion of the combined torque applied by the electric motor corresponding to that controller may be reduced (and the proportion applied by the other electric motor may be increased). The third and fourth temperature sensor may be provided in addition to, or alternatively to, the first and second temperature sensors mentioned above.

The power steering system may be configured to, in response to detecting a failure of one of the first electric motor and the second electric motor to apply a torque to the shaft, increase the torque applied to the shaft by the other one of the first electric motor and the second electric motor. In this manner, it may be able to compensate for failure of one of the electric motors, by increasing the amount of torque applied by the other electric motor. This may avoid a sudden loss of power steering, which in certain driving conditions could be dangerous and potentially result in a collision. For example, a single electric motor may be able to apply higher torques for a short period of time, in order to compensate for failure of one of the electric motors, so that the driver can safely bring the vehicle to a stop. In response to detecting a failure of one of the first electric motor and the second electric motor to apply a torque to the shaft, the proportion of the combined torque applied by the other electric motor may be increased.

The first electric motor may be mounted to the shaft at a first location on the shaft, and the second electric motor may be mounted to the shaft at a second location on the shaft, the second location being axially spaced from the first location. Thus, the first and second electric motors may be directly mounted to the shaft, at different positions along the shaft. This may provide for a convenient compact configuration of the two electric motors, such that the two electric motors may occupy a similar amount of space to a single larger electric motor. For instance, the first and second electric motors may be stacked along an axial direction of the shaft. The rotor of the first electric motor may be mounted to (connected to) the shaft and the rotor of the second electric motor may be mounted to (connected to) the shaft.

The power steering system may further comprise a first controller configured to control the first electric motor, and a second controller configured to control the second electric motor, the first controller and the second controller being configured to detect an angular position of the first electric motor and the second electric motor, respectively, based on a shared scale on the shaft. The sharing of a single scale for the two electric motors may serve to save space, by reducing duplication of components for the two electric motors. The first controller and the second controller may each comprise a respective encoder which is configured to detect an angular position of the corresponding electric motor, e.g. by reading the shared scale with a read head. The detected angular position of the electric motor may be used as feedback by the controller for controlling the electric motor.

The power steering system may further comprise a housing in which the first electric motor and the second electric motor are disposed. In this manner, the first and second electric motors may be provided as a single, compact unit. Using a single housing for the two electric motors may reduce an amount of space occupied by the power steering system, as well as facilitate integrating the power steering system into a vehicle.

In some embodiments, the power steering system may further comprise: a housing in which the first electric motor and the second electric motor are disposed, an air flow path being defined within the housing; and an air flow source arranged to generate an air flow along the air flow path to cool the first electric motor and the second electric motor. Thus, similarly to the discussion in relation to the first aspect of the invention, the first and second electric motors may be cooled by air flowing along the air flow path in the housing, in order to improve performance of the power steering system. The housing may include any of the features which are discussed above in relation to the first aspect of the invention.

Where the power steering system includes a first controller and a second controller, the first and second controllers may also be disposed within the housing. The air flow source may further be configured to cool the first and second controllers. For example, the air flow path in the housing may be arranged such that air flowing along the air flow path cools the first and second controllers.

Of course, in some embodiments, the power steering system may comprise more than two electric motors, e.g. three or more electric motors. In other words, the power steering system may comprise a plurality of electric motors, each of which is coupled to the shaft and configured to apply a torque to the shaft. Each of the plurality of electric motors may be coupled to the shaft such that cogging torques exerted by the plurality of electric motors on the shaft at least partially cancel each other out. The power steering system may be configured to control the plurality of electric motors to each apply a respective torque to the shaft for steering the vehicle during operation of the vehicle. Providing further electric motors may further improve a performance and reliability of the power steering system.

In embodiments where the power steering system further comprises a third electric motor, the first electric motor, second electric motor and third electric motor may be coupled to the shaft such that the first magnetic field in the first electric motor, the second electric field in the second electric motor, and a corresponding third magnetic field in the third electric motor are out of phase with respect to one another. In particular, the first magnetic field in the first electric motor may be out of phase with the second magnetic field in the second electric motor by a sixth of a magnetic field cycle, and the second magnetic field in the second electric motor may be out of phase with the third magnetic field in the third electric motor by a sixth of a magnetic field cycle. This may ensure that the cogging torques exerted on the shaft by the three electric motors substantially cancel each other out.

According to a third aspect of the invention, there is provided a vehicle comprising a power steering system according to the first aspect of the invention or according to the second aspect of the invention.

The vehicle may be any suitable type of vehicle, such as a car or truck. The vehicle may be an electric vehicle. Alternatively, the vehicle may have an internal combustion engine or a combination of electric and internal combustion engines (e.g. it may be a hybrid vehicle).

In some cases, the vehicle may be an autonomous vehicle, e.g. it may be a self-driving vehicle.

BRIEF DESCRIPTION OF THE DRAWINGS

Examples of the invention are discussed below with reference to the accompanying drawings, in which:

FIG. 2a is a schematic cross-sectional front view of an electric motor assembly that is part of an electric power steering system according to an embodiment of the invention;

FIG. 2b is a schematic cross-sectional side view of the electric motor assembly of FIG. 2a;

FIG. 2c is a schematic top view of the electric motor assembly of FIG. 2a;

FIG. 2d is a schematic view of an underside of the electric motor assembly of FIG. 2a;

FIG. 7b is a schematic cross-sectional front view of a shaft of the electric motor assembly of FIG. 7a;

FIG. 7c is a schematic cross-sectional side view of the shaft of the electric motor assembly of FIG. 7a;

FIG. 8b shows an unwrapped view of first and second rotors of the electric motor assembly of FIG. 8a;

FIG. 9 is a graph show magnetic field strength versus angular position for the first and second rotors of the electric motor assembly of FIG. 8a;

FIG. 10 is a circuit diagram depicting a circuit that may be used when assembling the electric motor assembly of FIG. 8a.

DETAILED DESCRIPTION; FURTHER OPTIONAL FEATURES

Figure 1:
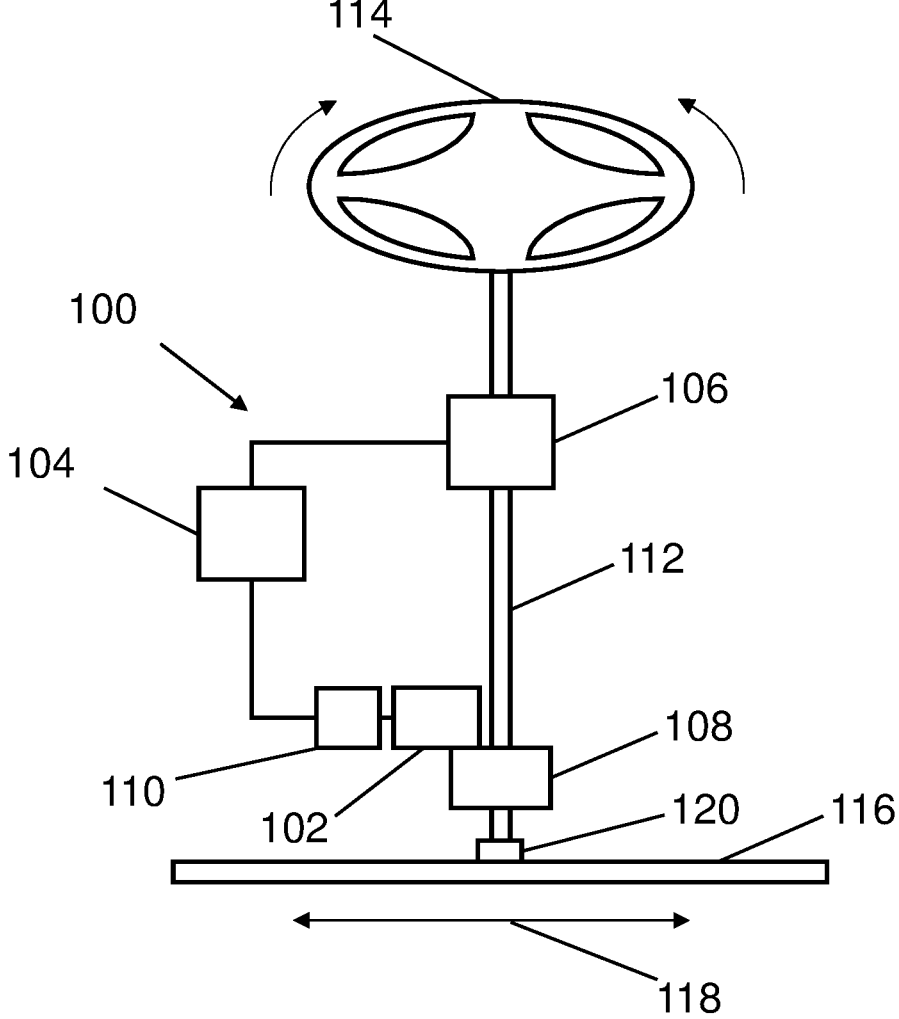
FIG. 1 is a schematic diagram of an electric power steering system according to an embodiment of the invention.

FIG. 1 shows a schematic diagram of an electric power steering system 100 according to an embodiment of the invention, where the power steering system 100 is integrated into a steering system of a vehicle. The power steering system 100 includes an electric motor 102, a control unit 104, a torque sensor 106, a transmission 108 and a controller 110. The torque sensor 106 is coupled to a steering column 112 of a vehicle, and configured to detect a torque applied to the steering column via a steering wheel 114 of the vehicle. Thus, when the steering wheel 114 is turned by a driver, a corresponding torque may be detected by the torque sensor 106. The torque sensor 106 may be in the form of a torque transducer, or a strain gauge, which is arranged to detect a torque applied to the steering column 112 via the steering wheel 114. A strain gauge may be preferred, as this may offer higher resolution, thus improving responsiveness of the power steering system.

The electric motor 102 is coupled to the steering column 112 via the transmission 108, so that a torque generated by the electric motor 102 can be transferred to the steering column 112. The electric motor 102 may be any suitable type of electric motor, such as a brushless DC motor, for example. The transmission 108 may comprise one or more gears which are connected between a rotor of the electric motor 102 and the steering column 112, in order to transfer a torque generated by the electric motor 102 to the steering column 112. In this manner, a torque generated by the electric motor 102 may cause the steering column 112 to rotate. The controller 110 is configured to power and control the electric motor 102. In particular, the controller 110 may include a power inverter and other electronics required for powering and controlling an angular position and velocity of the rotor of the electric motor 102.

The torque sensor 106 is communicatively coupled to the control unit 104 (e.g. via a wired or wireless connection), and configured to output a signal indicative of the detected torque to the control unit 104. The control unit 104 is configured to determine, based on the signal received from the torque sensor 106, a torque to be provided by the electric motor 102, and to transmit a corresponding control signal to the controller 110 (e.g. via a wired or wireless connection). For example, the torque to be provided by the electric motor 102 may be proportional to the torque detected by the torque sensor 106. Upon receipt of the control signal, the controller 110 controls the electric motor 102 to generate the required torque, which is transferred to the steering column 112 via the transmission 108. The control unit 104 may include any suitable computing device which is configured to perform the required operations.

The steering column 112 is coupled to a steering rack 116 of the vehicle such that rotation of the steering column 112 causes the steering rack 116 to be translated (e.g. left or right in FIG. 1, as illustrated by arrows 118). For instance, a pinion 120 at a distal end of the steering column 112 may be engaged in a rack on the steering rack 116. The steering rack 116 may itself be coupled to wheels (e.g. front wheels) of the vehicle via corresponding linkages, such that translation of the steering rack 116 causes the wheels to turn.

So, when a driver turns the steering wheel 114, the electric motor 102 may generate a torque (the amount of which is determined by the control unit 104 based on the torque detected by the torque sensor 106) which assists rotation of the steering column 112, which may facilitate turning of the wheels in order to steer the vehicle. Thus, the task of steering the vehicle may be greatly facilitated, as the amount of torque that the driver must apply to the steering wheel 114 in order to cause turning of the wheels may be reduced. In some cases, the power steering system 100 may be used in an autonomous (e.g. self-driving) vehicle. In such a case, additionally or alternatively to receiving a signal from the torque sensor 106, the control unit 104 may receive a signal from an autonomous driving system of the vehicle. For example, the signal from the autonomous driving system may be indicative of a direction in which the wheels are to be turned. The control unit 104 may then determine, based on the signal received from the autonomous driving system, a torque to be generated by the electric motor 102, and transmit a corresponding control signal to the controller 110.

Of course, power steering system 100 is provided by way of example only, and other configurations of the power steering system 100 are possible for controlling the torque generated by the electric motor 102 in order to steer the vehicle. In particular, alternative arrangements of the control unit 104 and torque sensor 106 may be used, and/or alternative sets of components may be used, in order to achieve the desired control of the electric motor 102.

In other embodiments (not shown), the transmission 108 may couple the electric motor 102 to the steering rack 116, rather than the steering column 110. In particular, the transmission 108 may be arranged to cause a translation of the steering rack as a result of a torque generated by the electric motor 102, in order to turn the wheels of the vehicle. More generally, the electric motor 102 may be coupled to a steering mechanism of the vehicle via the transmission 108, such that a torque or force generated by the electric motor 102 causes translation of the steering rack and thus turning of the wheels of the vehicle.

In embodiments of a first aspect of the invention, the electric motor 102 (and optionally the controller 110) may be disposed in a housing in which an air flow path is defined, and the power steering system 100 may comprise an air flow source arranged to generate an air flow along the air flow path in the housing, in order to cool the electric motor 102 (and optionally the controller). Examples of such embodiments are discussed below in relation to FIGS. 2a-d, 3, 4, 5, 6, and 7a-c.

In embodiments of a second aspect of the invention, the electric motor 102 may in fact comprise two or more electric motors, each of which is coupled to a common shaft and configured to apply a respective torque to the shaft. The two or more electric motors may be coupled to the shaft such that cogging torques exerted on the shaft by the two or more motors at least partially cancel each other out. Examples of such embodiments are discussed below in relation to FIGS. 5, 6, 7a-c, and 8a-b.

Figures 2A, 2B:
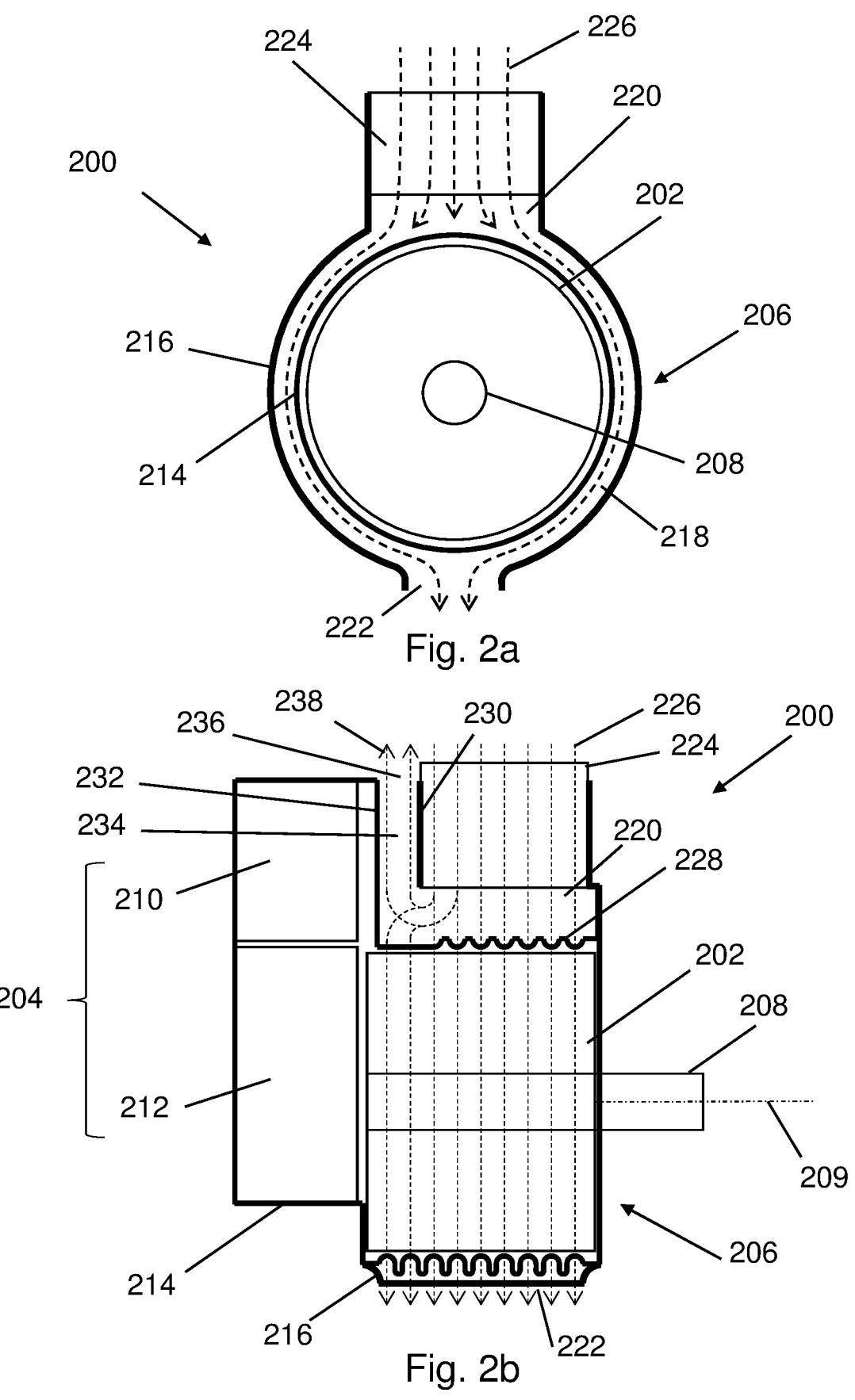
Figure 2C:
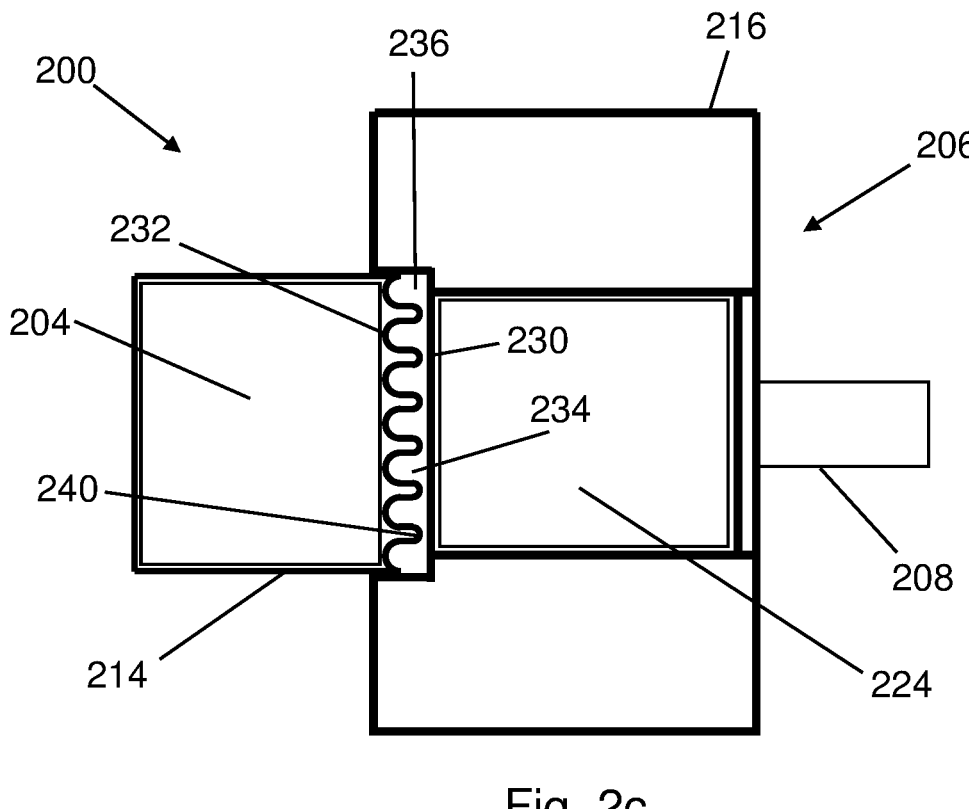
Figure 2D:
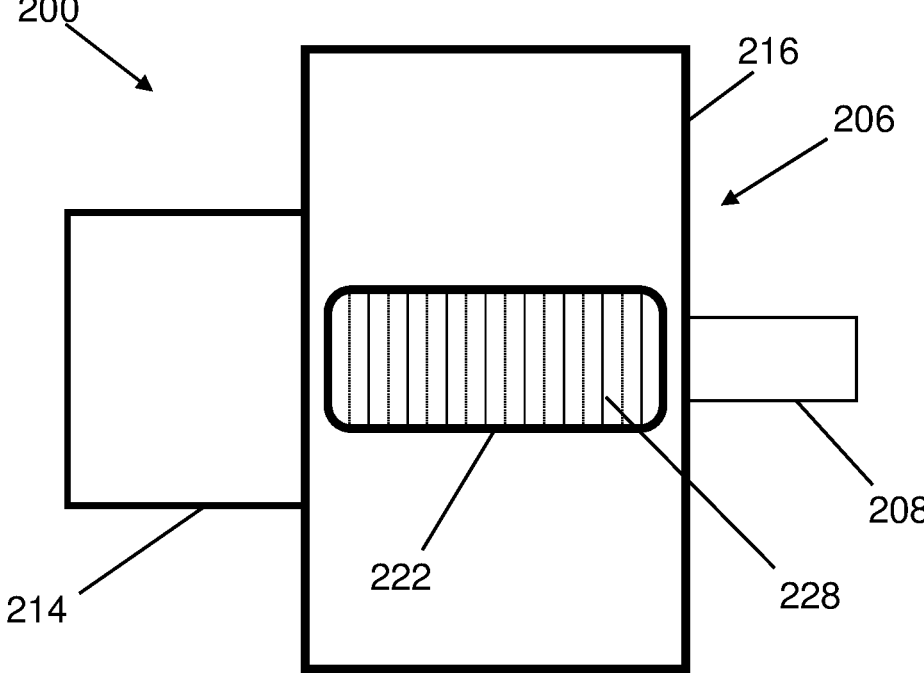

FIGS. 2a-2d are schematic drawings illustrating an electric motor assembly 200 of an electric power steering system that is an embodiment of the first aspect of the invention. FIG. 2a shows a cross-sectional front view of the electric motor assembly 200; FIG. 2b shows a cross-sectional side view of the electric motor assembly 200; FIG. 2c shows a top view of the electric motor assembly 200; and FIG. 2d shows a view of an underside of the electric motor assembly 200. The electric motor assembly 200 includes an electric motor 202, a controller 204, and a housing 206 in which the electric motor 202 and the controller 204 are disposed. The electric motor assembly 200 may be part of any electric power steering system. For example, the electric motor assembly 200 may be part of the electric power steering system 100 shown in FIG. 1, in which case the electric motor 202 may correspond to the electric motor 102 of FIG. 1, and the controller 204 may correspond to the controller 110 of FIG. 1.

The electric motor 202 may be any suitable type of electric motor for generating a torque, such as a brushless DC motor. The electric motor 202 includes a rotor which is connected to a shaft 208, such that the electric motor 202 can apply a torque to the shaft 208. The shaft 208 protrudes from the housing 206, so that the shaft may be coupled to a steering mechanism of the vehicle, e.g. via a suitable transmission. In some cases, a gear or pinion may be connected to the end of the shaft 208 that protrudes from the housing 206, for coupling it to a steering mechanism of the vehicle. In the example of FIG. 1, the shaft 208 may be coupled to the steering column 112 via the transmission 108, so that a torque generated by the electric motor 202 may be transferred to the steering column 112. The front view of FIG. 2a corresponds to a view along a longitudinal axis 209 of the shaft 208, which is shown in FIG. 2b.

The controller 204 includes a power inverter 210 for powering the electric motor 202, as well as control electronics 212. The control electronics 212 may include an interface for connecting the inverter 210 to the electric motor 202, as well as an encoder for reading an angular position of the shaft 208. The control electronics 212 may be, or may be coupled to, a control unit (e.g. control unit 104) of the power steering system, in order to receive a control signal from the control unit. In this manner, the control electronics 212 may control the electric motor 202 in accordance with the received control signal, e.g. by delivering an appropriate amount of power to the electric motor 202.

The housing 206 includes an inner housing 214, and an outer housing 216 which is disposed around part of the inner housing 214. The electric motor 202 and the controller 204 (including the inverter 210 and control electronics 212) are disposed within the inner housing 214. In particular, the inner housing 214 includes a first part (or compartment) in which the electric motor 202 is disposed, and a second part (or compartment) in which the controller 204 is disposed. As shown in FIG. 2a, the outer housing 216 is disposed around the first part of the inner housing 214 in which the electric motor 202 is disposed, and arranged such that a gap 218 is formed between walls of the inner housing 214 and the outer housing 216. The gap 218 between the inner housing 214 and the outer housing 216 serves to define a first air flow path within the housing 206. As shown in FIG. 2a, the gap 218 extends around a circumference of the electric motor 202 (which may have a generally cylindrical shape), such that the first air flow path has a ring-shape which extends around the circumference of the electric motor 202. In the example shown, the second part of the inner housing 214, in which the controller 204 is disposed, is arranged outside the outer housing 216; however, in other examples, the second part of the inner housing 214 may also be enclosed within the outer housing 216.

An air inlet 220 is formed in the outer housing 216 on a first side of the housing 206, and a first air outlet 222 is formed in the outer housing 216 on a second, opposite side of the housing 206. In particular, the air inlet 220 and the first air outlet 222 are arranged such that they are on diametrically opposite sides of the housing 206 with respect to the longitudinal axis 209 of the shaft 208. The air inlet 220 and the first air outlet 222 are in fluid communication with the gap 218, such that air can enter and exit the first air flow path defined in the housing 206 by the gap 218 via the air inlet 220 and the first air outlet 222. An air flow source in the form of a fan 224 is mounted over the air inlet 220 in the outer housing 216, the fan 224 being arranged to blow air into the air inlet 220, along the first air flow path in the housing 206 defined by the gap 218, and then out of first air outlet 222. The air flow thus produced by the fan 224 is illustrated by arrows 226 in FIGS. 2a and 2b. The air flow produced by the fan 224 may result in a layer of flowing air being established between the inner housing 214 and outer housing 216, which may enable effective cooling of the electric motor 202. Additionally or alternatively, another fan may be arranged at the first air outlet 222 in order to generate an air flow in the gap 218. Of course, it should also be noted that alternative arrangements of the air inlet 220 and the first air outlet 222 may be used in order to achieve an air flow in the gap between the inner housing 214 and the outer housing 216.

The electric motor 202 may be thermally coupled to the inner housing 214, so that heat generated by the electric motor 202 may be transferred to the inner housing 214. In this manner, heat generated by the electric motor 202 may be effectively removed via the air flow generated by the fan 224. The electric motor 202 may be thermally coupled to the inner housing 214 using any suitable means. For instance, one or more thermal links may be provided between the electric motor 202 and the inner housing. In some cases, the electric motor 202 may be secured to (or otherwise in close contact with) the inner housing 214 in order to facilitate heat transfer from the electric motor 202 and the inner housing 214. A thermal paste, an epoxy or a thermally conductive pad between the electric motor 202 and the inner housing 214 may also be used to provide good thermal coupling between the two.

The inner housing 214 may be made of a thermally conductive material (e.g. a metal), to enable effective heat transfer from the electric motor 202 to the inner housing 214. This may enable the inner housing 214 to act as a heat sink for the electric motor 202. The outer housing 216 may also be made of a thermally conductive material, e.g. the same material used for the inner housing 214. The inner housing 214 and outer housing 216 may be thermally coupled together (e.g. via contact between the two parts, and/or via fasteners which are used to secure them together), so that heat from the electric motor 202 may further be transferred to the outer housing 216. Thus, the housing 206 may provide a large thermal mass which can act as a heat sink for dissipating heat from the electric motor 202. This, coupled with the air flow generated in the housing 206 by the fan 224, may enable effective cooling of the electric motor 202.

As shown in FIG. 2*b*, a first plurality of fins 228 is provided on an outer surface of the inner housing 214, such that the first plurality of fins 228 is disposed in the gap between the inner housing 214 and the outer housing 216. The fins 228 extend around the entire circumference of the inner housing 214, such that they form a series of rings on the outer surface of the inner housing 214. The rings formed by the fins 228 are arranged in a direction that is substantially perpendicular to the longitudinal axis 209 of the shaft 208. The fins 228 serve to guide air flow within the gap 218, by forming a series of channels in the gap 218. This may promote rapid air flow within the gap 218, as well as increase turbulence. The fins 228 also act to increase a surface area of the inner housing 214, thus promoting heat exchange between the inner housing 214 and air flowing the gap 218. The fins 228 are visible through the first air outlet 222 in the outer housing 216 in FIG. 2*d*. For clarity purposes, the fins 228 are omitted from FIG. 2*a*. Although in the examples shown, the fins 228 are substantially straight (e.g. they are aligned along substantially parallel planes), other shapes and configurations of fins may be used. For example, the fins 228 may be arranged to define one or more spiral-shaped channels around the inner housing 214.

Air flow generated by the fan 224 is further used to cool the controller 204. In particular, a second air flow path is defined in the housing 206 for cooling the controller 204, the second air flow path being in fluid communication with the air inlet 220 such that the fan 224 also causes air to flow along the second air flow path to cool the controller 204. The second air flow path is defined by a gap between the outer housing 216 and part of the inner housing 214 which contains the controller 204. More specifically, the outer housing 216 includes a portion 230 which extends along a portion 232 of the inner housing 214 in which the controller 204 is contained, such that a gap 234 is formed therebetween. The gap 234 is in fluid communication with the air inlet 220, such that air may flow from the air inlet into the gap 234, and a second air outlet 236 is formed at an end of the gap 234, via which the air flow may exit. Thus, the second air flow path extends from the air inlet 220, along the gap 234 between the portion 230 of the outer housing 216 and the portion 232 of the inner housing 214, to the second air outlet 236. An air flow generated by the fan 224 along the second air flow path is illustrated by arrows 238 in FIG. 2*b*.

Similarly to the electric motor 202, the controller 204 (including its various components) may be thermally coupled to the inner housing 214, in order to enable effective heat transfer from the controller 204 to the inner housing 214. For example, as shown in FIG. 2*b*, the inverter 210 and control electronics 212 of the controller 204 may be directly mounted on a wall of the inner housing 214. Then, heat from the controller 204 which is transferred to the inner housing may be removed by the air flow along the second air flow path, to provide effective cooling of the controller 204.

As shown in FIG. 2*c*, the portion 232 of the inner housing 214 may include a second plurality of fins 240 formed thereon, such that the second plurality of fins 240 is disposed within the gap 234. The fins 240 may serve to define a series of channels which extend along the portion 232 of the inner housing 214 towards the second outlet 236. Thus, the fins 240 may act to guide air flow along the second air flow path. Similarly to the fins 228, the fins 240 may serve to improve cooling efficiency, e.g. by promoting rapid air flow, increasing turbulence, and increasing a surface area of the portion 232 of the inner housing 214. Furthermore, as shown in FIG. 2*b*, the first plurality of fins 228 have a lower height in a vicinity of the air inlet 220, as compared to their height away from the air inlet 220 (e.g. in the vicinity of the first air outlet 222). The low height of the fins 228 in the vicinity of the air inlet 220 may serve to ensure that the fins 228 do not block air flow into the gap 234, such that an adequate air flow may be established along both air flow paths. Additionally, the low height of the fins 228 in the vicinity of the air inlet 220 may improve distribution of air flow amongst the series of channels defined by the fins, thus promoting a more uniform air flow within the gap 218.

During operation of the power steering system, the fan 224 may therefore act to cool the electric motor assembly 200. In particular, the fan 224 may generate an air flow along the first air flow path between the air inlet 220 and the first air outlet 222 for cooling the electric motor 202, as well as an air flow along the second air flow path between the air inlet 220 and the second air outlet 236 for cooling the controller 204. Thus, the electric motor assembly 200 may be effectively cooled during operation, which may avoid overheating of the electric motor assembly 200 and any of its components.

The inner housing 214 and the outer housing 216 may be provided as separate parts which are mounted together via any suitable means. However, in some cases, the inner housing 214 and the outer housing 216 may actually be formed as a single part, e.g. the housing 206 may be provided as a single part. In such a case, the gap 218 and the gap 234 may be formed as channels or galleries within a wall of the housing 206. Forming the inner housing 214 and the outer housing 216 as a single part may promote heat transfer from the inner housing 214 to the outer housing 216, which may improve an overall cooling efficiency of the electric motor assembly 200.

In some embodiments, a temperature sensor may be disposed within the inner housing 214 and arranged to detect a temperature of the electric motor 202. The temperature sensor may be configured to output a signal to a control unit of the power steering system (e.g. control unit 104) which is indicative of the detected temperature. The control unit may then be configured to control the fan 224 in order to control cooling of the electric motor 202. For example, the control unit may be communicatively coupled to the fan 224 so that the control unit can control a speed of the fan 224. This may enable the power steering system to react to changes in temperature of the electric motor, which may facilitate maintaining the electric motor 202 at a suitable temperature, as well as improve a power efficiency of the power steering system.

Figure 3:
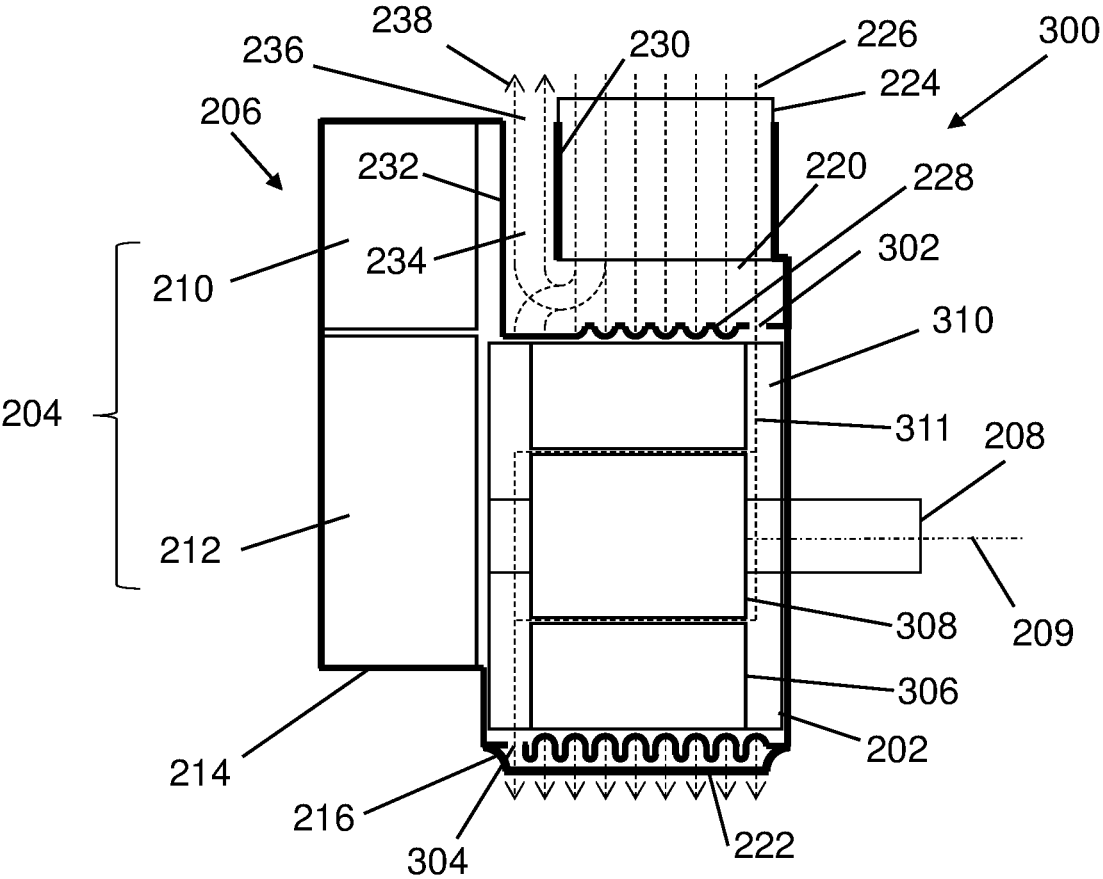
FIG. 3 is a schematic cross-sectional side view of an electric motor assembly that is part of an electric power steering system according to an embodiment of the invention.

FIG. 3 is a schematic diagram illustrating an electric motor assembly 300 of an electric power steering system that is an embodiment of the first aspect of the invention. FIG. 3 shows a cross-sectional side view of the electric motor assembly 300. The electric motor assembly 300 is based on similar principles to the electric motor assembly 200 discussed above. So, for convenience, features of the electric motor assembly 300 which correspond to features of the electric motor assembly 200 are indicated in FIG. 3 using the same reference numerals as in FIG. 2, and are not described again.

In addition to the first air flow path and the second air flow path discussed above in relation to electric motor assembly 200, a third air flow path is defined within the housing 206 of the electric motor assembly 300. In particular, a first aperture 302 and a second aperture 304 are formed in the inner housing 214, with the first aperture 302 facing the air inlet 220 in the outer housing 216 and the second aperture 304 facing the first air outlet 222 in the outer housing 216. In this manner, air may enter and exit the inner housing 214 via the first and second apertures 302, 304 in the inner housing 214. The first and second apertures 302, 304 are formed in the first part of the inner housing 214, which contains the electric motor 202. The first and second apertures 302, 304 may be in the form of thin slots in the inner housing 214, the slots having a length corresponding approximately to a width of the fan 224.

As shown in FIG. 3, the first aperture 302 and the second aperture 304 are arranged near opposing ends of the electric motor 202, the opposing ends of the electric motor 202 corresponding to ends of the electric motor 202 which are spaced along the longitudinal axis 209 of the shaft 208. In this manner, air flowing between the first aperture 302 and the second aperture 304 may pass through the electric motor 202, e.g. through a gap between a stator 306 and a rotor 308 of the electric motor 202, as shown by the dashed lines 311. Moreover, the electric motor 202 may be arranged in the inner housing 214 such that air flowing between the first and second apertures 302, 304 is forced through the gap between the stator 306 and the rotor 308, by blocking other air flow paths within the inner housing 214. This may be achieved, for example, by sealing a gap between a casing 310 of the electric motor 202 and the inner housing 214, as well as sealing a gap between the casing 310 and the stator 306.

Thus, a third air flow path is defined in the housing 206 of the electric motor assembly 300, the third air flow path going from the air inlet 220, into the inner housing 214 via the first aperture 302, through the gap between the stator 306 and the rotor 308, out of the inner housing 214 via the second aperture 304, and finally out of the outer housing 216 via the first air outlet 222. Providing such a third air flow path which passes directly through internal components of the electric motor 202 may further improve cooling efficiency of the electric motor 202. Of course, different locations and arrangements of apertures may be provided in the inner housing 214 in order to achieve an air flow path that passes through the electric motor 202. In some cases, apertures of different sizes may be used, and/or a greater number of apertures may be used.

In order to prevent dust, dirt and/or moisture which from being entrained along the third air flow path, and which could cause damage to the electric motor 202, air filters may be placed at the air inlet 220 and the first and second air outlets 222, 236. More generally, air filters may be placed at the air inlets and/or the air outlets in any of the embodiments discussed herein, in order to prevent dust, dirt and/or moisture from entering the housing.

Figure 4:
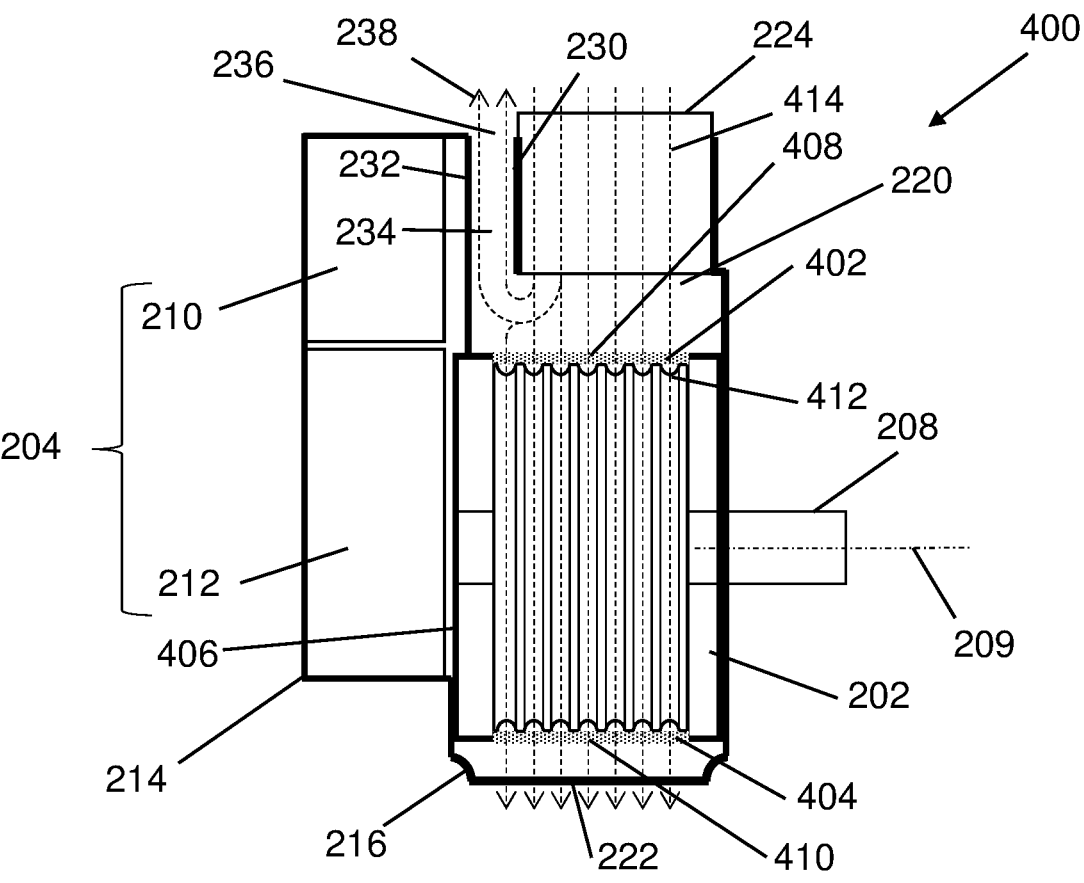
FIG. 4 is a schematic cross-sectional side view of an electric motor assembly that is part of an electric power steering system according to an embodiment of the invention.

FIG. 4 is a schematic diagram illustrating an electric motor assembly 400 of an electric power steering system that is an embodiment of the first aspect of the invention. FIG. 4 shows a cross-sectional side view of the electric motor assembly 400. The electric motor assembly 400 is based on similar principles to the electric motor assembly 200 discussed above. So, for convenience, features of the electric motor assembly 400 which correspond to features of the electric motor assembly 200 are indicated in FIG. 4 using the same reference numerals as in FIG. 2, and are not described again.

In addition to the first air flow path and the second air flow path discussed above in relation to electric motor assembly 200, a third air flow path is defined within the housing 206 of the electric motor assembly 400. In particular, a first opening 402 and a second opening 404 are formed in the inner housing 214, with the first opening 402 facing the air inlet 220 in the outer housing 216 and the second opening 404 facing the first air outlet 222 in the outer housing 216. In this manner, air may enter and exit the inner housing 214 via the first and second openings 402, 404 in the inner housing 214. The first and second openings 402, 404 are formed in the first part of the inner housing 214, which contains the electric motor 202. The inner housing 214 further comprises an internal dividing wall 406, disposed between the first part of the inner housing 214 in which the electric motor 202 is located and the second part of the inner housing 214 in which the controller 204 is located. In this manner, air flowing between the first and second openings 402, 404 may flow over a surface of the electric motor 202, but be prevented from flowing into the part of the inner housing 214 containing the controller 204. Additionally, the first and second openings 402, 404 are covered by respective air filters 408, 410, in order to prevent dust, dirt and/or moisture from entering into the inner housing 214.

A series of channels 412 are formed in an outer surface of the electric motor 202. The channels 412 form a series of rings around a circumference of the electric motor 202, and are arranged in a direction that is substantially perpendicular to the longitudinal axis 209 of the shaft 208. In this manner, the channels 412 extend in a direction linking the first and second openings 402, 404. The outer surface of the electric motor 202 in which the channels 412 are formed may correspond, for example, to a surface of a casing of the electric motor 202, or to an outer surface of a stator of the electric motor (e.g. a back iron of the stator). The channels 412 serve to guide air flow between the first and second openings 402, 404, in order to promote rapid air flow along the outer surface of the electric motor 202, which may result in a more efficient cooling of the electric motor 202. In the cross-sectional view of FIG. 4, all of the components of the electric motor assembly 400 are shown, except for the electric motor 202 whose outer surface is shown in order to depict the channels 412.

Thus, a third air flow path is defined in the housing 206 of the electric motor assembly 400, the third air flow path going from the air inlet 220, into the inner housing 214 via the first opening 402, along the channels 412 formed in the outer surface of the electric motor 202, out of the inner housing 214 via the second opening 404, and finally out of the outer housing 216 via the first air outlet 222. The air flow generated by the fan 224 and which passes along the channels 412 is indicated by the arrows 414 in FIG. 4. Providing such a third air flow path which passes directly over the outer surface of the electric motor 202 may further improve cooling efficiency of the electric motor 202. Of course, different locations and arrangements of openings may be provided in the inner housing 214 in order to achieve an air flow path that passes through the electric motor 202. In some cases, openings of different sizes may be used, and/or a greater number of openings may be used.

It should be noted that, in different embodiments, different combinations of the air flow paths discussed above in relation to FIGS. 2-4 may be defined within the housing of an electric motor assembly. For example, embodiments of the invention may comprise one or more of the first air flow path, the third air flow path discussed in relation to FIG. 3 and the third air flow path discussed in relation to FIG. 4, for cooling the electric motor. Additionally, different configurations of the second air flow path for cooling the controller may be used or, in some embodiments, the second air flow path may be omitted altogether.

Figure 5:
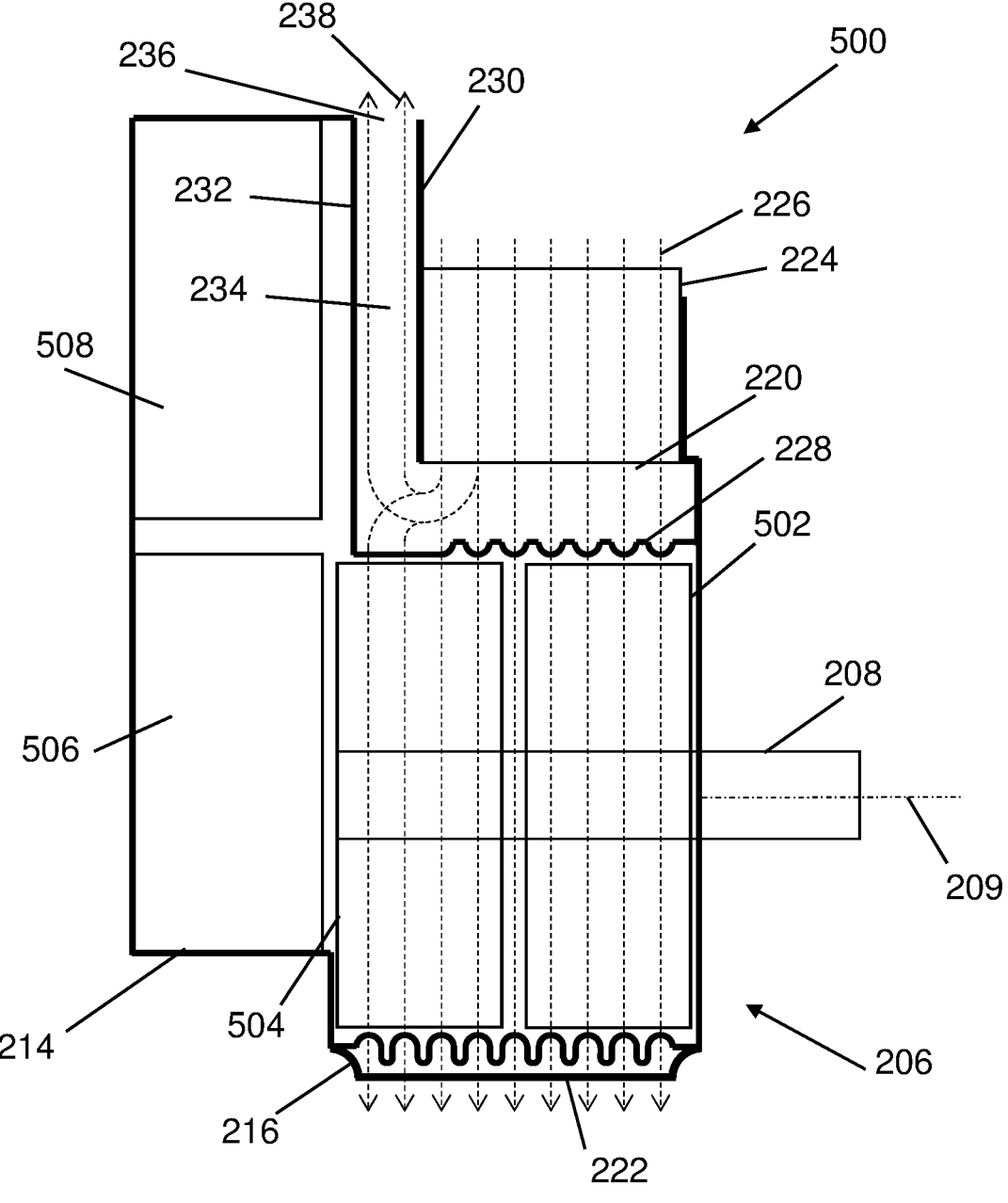
FIG. 5 is a schematic cross-sectional side view of an electric motor assembly that is part of an electric power steering system according to an embodiment of the invention.

FIG. 5 is a schematic diagram illustrating an electric motor assembly 500 of an electric power steering system that is an embodiment of the first and second aspects of the invention. FIG. 5 shows a cross-sectional side view of the electric motor assembly 500. The electric motor assembly 500 is based on similar principles to the electric motor assembly 200 discussed above. So, for convenience, features of the electric motor assembly 500 which correspond to features of the electric motor assembly 200 are indicated in FIG. 5 using the same reference numerals as in FIG. 2, and are not described again.

The electric motor assembly 500 is a variation of the electric motor assembly 200 where, instead of using a single electric motor, two electric motors are used. Thus, the electric motor assembly 500 includes a first electric motor 502 and a second electric motor 504, both of which are disposed in the inner housing 214. The first and second electric motors 502, 504 occupy substantially the same space in the inner housing 214 as the electric motor 202 discussed above. Thus, both the first electric motor 502 and the second electric motor 504 may be cooled by air flowing along the first air flow path in the housing 206 (i.e. the air flow path between the air inlet 220 and the first air outlet 222), in a similar way to the electric motor 202 of the electric motor assembly 200.

Both the first and second electric motors 502, 504 are coupled to the shaft 208 and arranged to apply a torque to the shaft 208. In particular, a rotor of the first electric motor 502 and a rotor of the second electric motor 504 are both connected to the shaft 208. The first electric motor 502 and the second electric motor 504 are coupled to the shaft 208 at different positions along a length of the shaft 208, such that the first and second electric motors 502, 504 are effectively stacked along a length of the shaft 208. The rotor of the first electric motor 502 and the rotor of the second electric motor 504 are connected to the shaft 208 such that a cogging torque exerted by the first electric motor 502 on the shaft 208 at least partially cancels a cogging torque exerted by the second electric motor 504 on the shaft 208. More detail is provided below about how the rotors of the first and second electric motors 502, 504 can be connected to the shaft 208 in order to achieve the desired cancellation of the cogging torque, with reference to FIGS. 8a-10.

The electric motor assembly 500 includes a first controller 506 and a second controller 508, which are arranged next to each other in the second part of the inner housing 214. The first controller 506 is configured to control the first electric motor 502, and the second controller 508 is configured to control the second electric motor 504. The first and second controllers 506, 508 may each be configured in a similar manner to the controller 204 discussed above, and may each include components similar to those of the controller 204. As shown in FIG. 5, the second part of the inner housing 214 is extended compared to the embodiment of FIG. 2, in order to house both the first and second controllers 506, 508. Similarly, the portion 230 of the outer housing 216 and the portion 232 of the inner housing 214 are extended, so that a length of the second air flow path is increased. This may ensure effective cooling of the first and second controllers 506, 508 by the air flowing along the second air flow path.

During operation of the power steering system including electric motor assembly 500, a control unit of the power steering system (e.g. control unit 104) may transmit control signals to each of the first controller 506 and the second controller 508, in order to control a respective torque applied on the shaft 208 by each of the first and second electric motors 502, 504. Thus, both the first and second electric motors 502, 504 may contribute to a total combined torque applied to the shaft 208. Furthermore, the control unit may control a proportion of the total combined torque applied to the shaft 208 by each of the first and second electric motors 502, 504, e.g. depending on a performance of each of the electric motors.

This may, for example, enable the control unit to react to a failure of one of the first and second electric motors 502, 504 to apply a torque to the shaft 208, in order to avoid sudden loss of power steering. For instance, the control unit may be configured such that, when a failure of one of the first and second electric motors 502, 504 to apply a torque to the shaft 208 is detected, the control unit increases an amount of torque applied by the other one of the first and second electric motors 502, 504. As an example, during normal operation, the first and second electric motors 502, 504 may apply a substantially equal amount of torque to the shaft 208. However, when a failure occurs with a first one of the first and second electric motors 502, 504 occurs, the second one of the first and second electric motors 502, 504 may be controlled to apply a larger amount of torque to the shaft 208, to compensate for the reduced (or in some cases zero) torque applied by the first one of the first and second electric motors 502, 504. A single one of the first and second electric motors 502, 504 may be operated for a short period of time to provide a torque which corresponds to more than 50% of the total combined torque which is achievable with the two electric motors, without that electric motor also failing. In some cases the torque achievable (for a short period of time) with a single one of the first and second electric motors 502, 504 may be about 70% of the total combined torque which is achievable with the two electric motors. This may ensure that the power steering system is still able to provide a significant amount of steering power for a certain amount of time, where there is a failure with one of the first and second electric motors 502, 504. This may enable a driver of the vehicle to safely bring the vehicle to a stop. Herein, a failure of one of the first and second electric motors 502, 504 to apply a torque to the shaft 208 may refer to a failure of one of the first and second electric motors 502, 504 themselves, and/or a failure of one of the first and second controllers 506, 508.

In some embodiments, the electric motors assembly may include a first temperature sensor arranged to detect a temperature of the first electric motor 502 and a second temperature sensor arranged to detect a temperature of the second electric motor 504. For instance, the first and second temperature sensors may be placed in contact with the corresponding electric motor inside the inner housing 214. Each of the first and second temperatures sensors may be configured to output a respective signal to the control unit of the power steering system, which is indicative of a current temperature of the corresponding electric motor. In this manner, the control unit may control the torque applied by each of the first and second electric motors 502, 504 based on their temperatures. In particular, the control unit may adjust the proportion of the total combined torque which is applied by each of the first and second electric motors 502, 504 to the shaft 208. For example, if the control unit determines that one of the electric motors is overheating (e.g. based on a high temperature reading from the corresponding temperature sensor), the control unit may reduce the proportion of the total combined torque applied by that electric motor, and increase the proportion of the total combined torque applied by the other electric motor.

Of course, any features discussed above in relation to the embodiments of FIGS. 3 and 4 may also be applied to the electric motor assembly 500.

Figure 6:
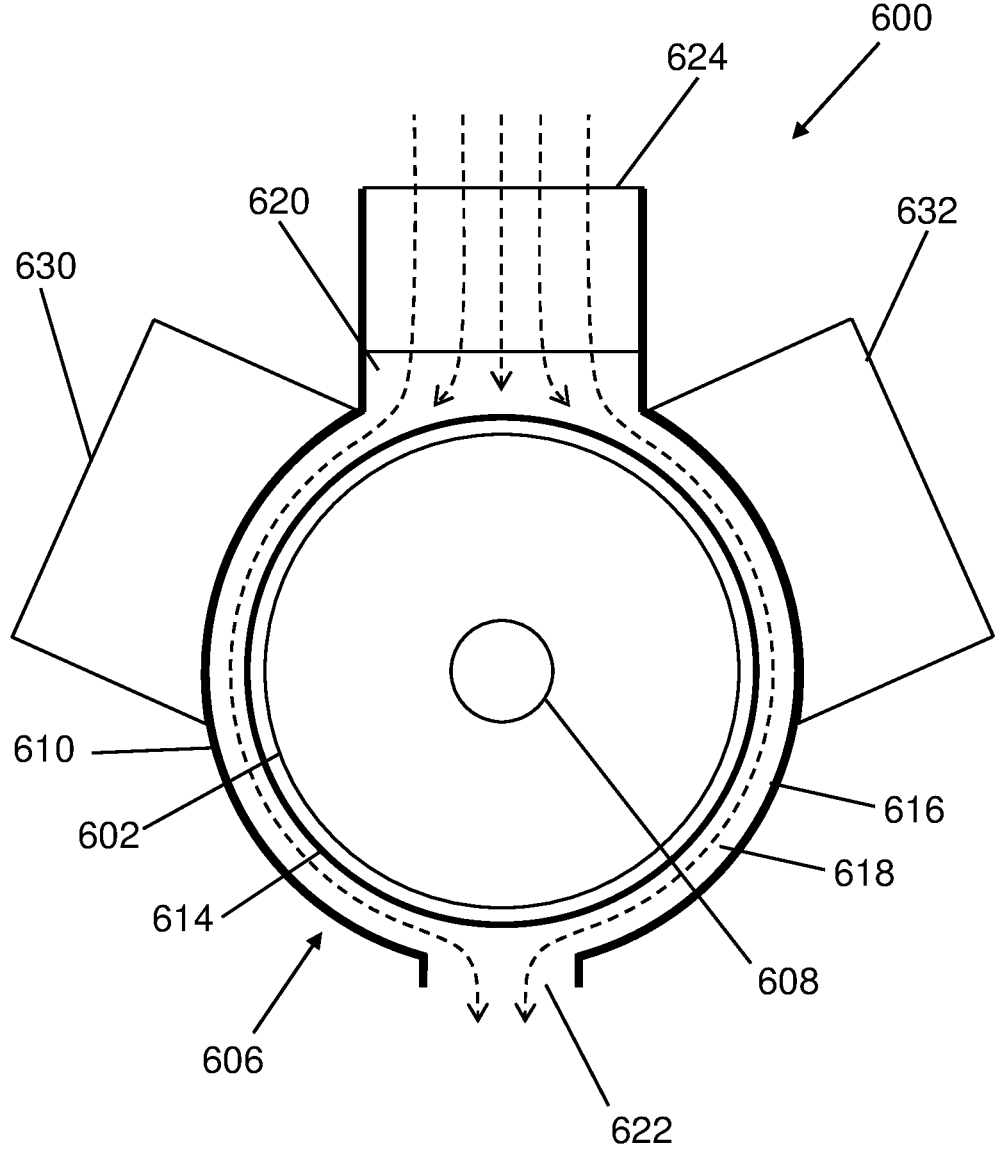
FIG. 6 is a schematic cross-sectional front view of an electric motor assembly that is part of an electric power steering system according to an embodiment of the invention.

FIG. 6 is a schematic diagram illustrating an electric motor assembly 600 of an electric power steering system that is an embodiment of the first and second aspects of the invention. FIG. 6 shows a cross-sectional front view of the electric motor assembly 600. The electric motor assembly 600 includes a first electric motor 602 and a second electric motor (not visible in FIG. 6), both of which are coupled to a shaft 608 in a similar manner to the first and second electric motors 502, 504 as described above. In other words, the first electric motor 602 and the second electric motor are stacked along a length of the shaft 608, such that in the view of FIG. 6, the first electric motor 602 is disposed directly in front of the second electric motor. Moreover, a rotor of the first electric motor 602 and a rotor of the second electric motor are connected to the shaft 608 such that a cogging torque exerted by the first electric motor 602 on the shaft 608 at least partially cancels a cogging torque exerted by the second electric motor on the shaft 608.

The electric motor assembly 600 further includes a housing 606 which includes an inner housing 614 and an outer housing 616. The first electric motor 602 and the second electric motor are disposed within the inner housing 614. The inner housing 614 and the outer housing 616 are arranged in a similar manner to the inner housing 214 and the outer housing 216 of electric motor assembly 200, such that a ring-shaped gap 618 is formed between the inner housing 614 and the outer housing 616. Similarly to electric motor assembly 200, the gap 618 serves to define an air flow path in the housing 606 between an air inlet 620 in the outer housing 606 and an air outlet 622 of the outer housing. Further, a fan 624 is provided to generate an air flow along the air flow path. Thus, the first and second electric motors of the electric motor assembly 600 may be cooled in a substantially similar manner to the electric motor 202 of the electric motor assembly 200.

The electric motor assembly 600 further includes a first controller 630 configured to control the first electric motor 602, and a second controller 632 configured to control the second electric motor. The first and second controllers 630, 632 may each be configured in a similar manner to the controller 204 discussed above, and may each include components similar to those of the controller 204. The first controller 630 and the second controller 632 are both mounted on an outer wall 610 of the outer housing 616, such that the first and second controllers 630, 632 are disposed outside the housing 606. The outer wall 610 of the outer housing 616 is disposed between each of the first and second controllers 630, 632 and the air flow path defined inside the housing 606, i.e. the first and second controllers 630, 632 are mounted on an opposite side of the outer wall 610 relative to the air flow path. As a result, the first and second controllers 630, 632 are disposed on an opposite side of the air flow path compared to the first and second electric motors, with the air flow path effectively passing between the first and second controllers 630, 632 and the first and second electric motors.

The outer housing 616 is made of a thermally conductive material (e.g. metal), such that heat generated by the first and second controllers 630, 632 may be transferred to, and dissipated by, the outer housing 616. In particular, heat transferred by the first and second controllers 630, 632 to the outer housing 616 may be removed by air flowing along the air flow path in the housing, such that the first and second controllers 630, 632 may be effectively cooled.

In some embodiments, the electric motor assembly 600 may be modified to include only a single electric motor, in which case only a single controller may be mounted on the outer wall 610 of the outer housing 616.

Figure 7A:
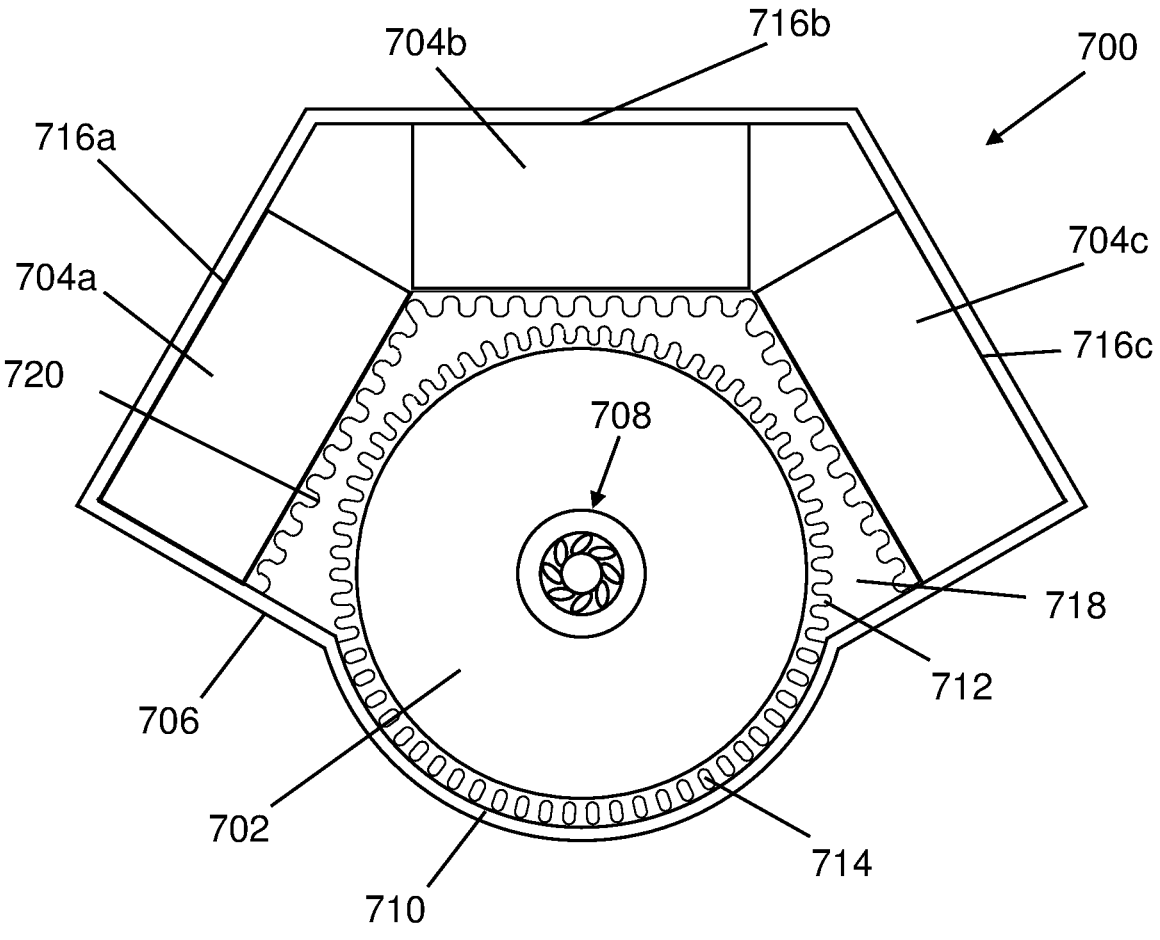
FIG. 7a is a schematic cross-sectional front view of an electric motor assembly that is part of an electric power steering system according to an embodiment of the invention.

FIG. 7a is a schematic diagram illustrating an electric motor assembly 700 of an electric power steering system that is an embodiment of the first and second aspects of the invention. FIG. 7a shows a cross-sectional front view of the electric motor assembly 700. The electric motor assembly 700 includes three electric motors 702 and three controllers 704a, 704b, 704c, all of which are disposed within a housing 706 of the electric motor assembly 700.

Each of the three electric motors 702 is connected to a common shaft 708, where a longitudinal axis of the shaft 708 extends in a direction normal to the cross-section depicted in FIG. 7a. In particular, a respective rotor of each of the three electric motors 702 is coupled to the shaft 708, such that each of the three electric motors 702 can apply a respective torque to the shaft 702. Each of the three electric motors 702 is coupled to the shaft 708 at a different position along a length of the shaft 708, such that the three electric motors 702 are effectively stacked along the longitudinal axis of the shaft 708. In FIG. 7a, only a first one of the three electric motors 702 is visible, as it is disposed in front of the other two electric motors. Moreover, each of the three electric motors 702 is be coupled to the shaft 708 such that cogging torques exerted by the three electric motors 702 on the shaft 708 at least partially cancel each other out.

Each of the three controllers 704a, 704b, 704c is associated with a respective one of the three electric motors 702, and configured to control the respective one of the three electric motors 702. Each of the three controllers 704a, 704b, 704c may be configured in a similar manner to the controller 204 discussed above, and each may include components similar to those of the controller 204.

The three electric motors 702 each have a generally cylindrical shape, and are mounted against a curved mounting surface (or wall) 710 of the housing. A curvature of the mounting surface 710 of the housing substantially matches a curvature of the cylindrically shaped electric motors 702, such that the electric motors 702 may be mounted flush against the mounting surface 710. Additionally, each of the three electric motors 702 includes an outer casing in which a plurality of fins 712 are formed. The fins 712 are formed around an entire circumference of each of the three electric motors, and extend in a direction parallel to the longitudinal axis of the shaft 708. The fins 712 may be formed integrally as part of the outer casings of the electric motors 702, e.g. grooves may be formed directly in a material of the outer casings. Alternatively, the fins 712 may be adhered (or otherwise secured) onto an outer surface of the outer casings of the electric motors 702. On a side of the electric motors 702 which faces the mounting surface 710 of the housing, the fins 712 are shaped to form elongated galleries 714 between the outer casings of the electric motors 702 and the mounting surface 710. In this manner, air may flow through the galleries 714, between the electric motors 702 and the mounting surface 710.

The housing 706 further includes respective mounting surfaces (or walls) 716a, 716b, 716c, on which each of the three controllers 704a, 704b, 704c is respectively mounted. The mounting surfaces 716a, 716b, 716c are arranged such that the three controllers 704a, 704b, 704c are spaced apart from the three electric motors 702 in a direction normal to the longitudinal axis of the shaft 708. In this manner, a space 718 is formed inside the housing 706 between the three electric motors 702 and the three controllers 704a, 704b, 704c. Additionally, an exposed surface of each of the three controllers 704a, 704b, 704c which faces towards the electric motors 702 (i.e. which faces the space 718) is provided with a plurality of fins 720. The fins 720 may cover the entire exposed surface of each of the three controllers 704a, 704b, 704c, and extend in a direction parallel to the longitudinal axis of the shaft 708. The fins 720 may be formed directly on the exposed surfaces of the three controllers 704a, 704b, 704c, or they may be adhered (or otherwise secured) onto the exposed surfaces of the three controllers 704a, 704b, 704c.

Figure 7B:
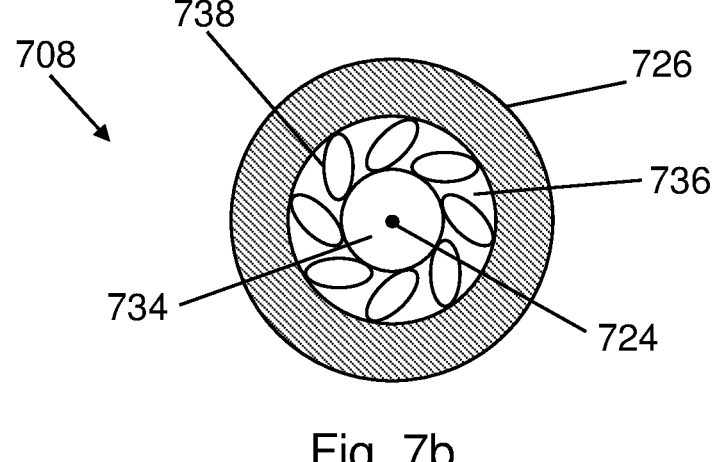
Figure 7C:
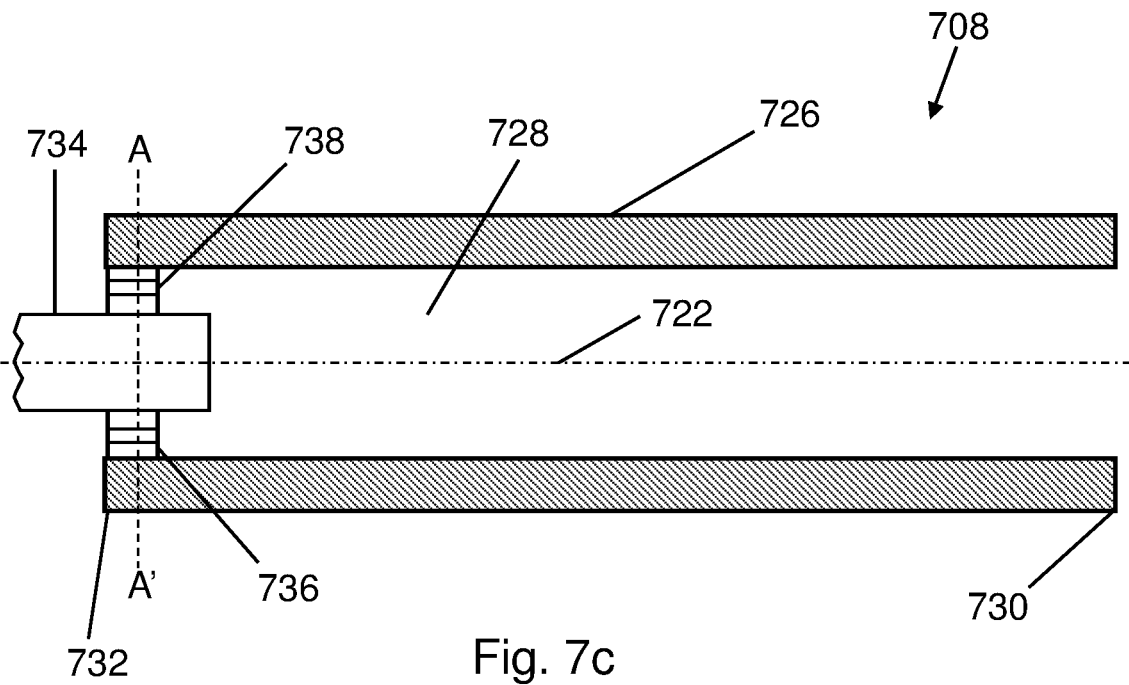

Furthermore, the shaft 708 itself is hollow, so that air may flow within the shaft 708. The shaft 708 is illustrated in more detail in FIGS. 7b and 7c, with FIG. 7b showing a cross-sectional front view of the shaft 708, and FIG. 7c showing a cross-sectional side view of the shaft 708. The longitudinal axis of the shaft 708 is indicated by the dashed line 722 in FIG. 7c, and by the point 724 in FIG. 7b. The cross-sectional view of FIG. 7b corresponds to a view of the A-A' section shown in FIG. 7c.

The shaft is formed of a hollow tube 726 which defines a lumen 728 through which air may flow. The hollow tube 726 is open at a first end 730 so that air may enter the hollow tube at the first end 730. A second end 732 of the hollow tube 726 is partially closed, by means of rod 734. The rod 734 is mounted at the second end 732 via a ring 736 which is disposed within the lumen 728 and secured to the hollow tube 726. The ring 736 is disposed around the rod 734 and secured to the rod 734, such that the rod is centred about the longitudinal axis of the shaft 708. The ring 736 includes a series of apertures 738 arranged around the rod 734, so that air may exit the hollow tube 726 via the apertures 738. Of course, different shapes and arrangements of apertures 738 may be used, compared to the example shown in FIGS. 7a-c.

As noted above, the three electric motors 702 are coupled to the shaft 708. More specifically, the rotors of the electric motors 702 are connected to the hollow tube 726, at respective positions along a length of the hollow tube 726. Thus, the three electric motors 702 may apply a torque to the hollow tube 726. The torque applied to the hollow tube 726 is transferred to the rod 734 via the ring 736. Thus, connections between the hollow tube 726 and the ring 736, and between the ring and the rod 734 must be of suitable strength to enable transfer of torque from the hollow tube 726 to the rod 734. For instance, the connections may be formed by welding the parts together. The rod 734 is arranged to be connected at a distal end (not shown in FIG. 7c, as indicated by the jagged line) to a transmission (e.g. gear train) which couples it to a steering system of the vehicle, so that the torque generated by the three electric motors can be transferred to the steering system.

Accordingly, air may flow within the housing 706, along various air flow paths. A first air flow path is defined by the space 718, a second air flow path is defined by the galleries 714, and a third air flow path is defined by the lumen 728 in the shaft 708. In particular, the third air flow path may extend at least from the first end 730 of the hollow tube 726 to the apertures 738 located at the second end 732 of the hollow tube 726. In this manner, an air flow may be generated along these different air flow paths in order to cool components of the electric motor assembly 700. In particular, air flowing along the first air flow path may cool the three electric motors 702 and the three controllers 704a, 704b, 704c. The fins 712 and 720 may serve to guide air flow along the first air flow path, and improve cooling efficiency along the first air flow path. Air flowing along the second and third air flow paths may serve may serve to cool the three electric motors 702, with the second air flow path serving to cool the outer casings of the three electric motors 702, and the third air flow path serving to cool internal components of the three electric motors 702. Additionally, air flow along the three air flow paths may act to cool the housing 706 itself. Similarly to embodiments discussed above, the housing 706 may be made of a thermally conductive material (e.g. metal) to further aid with dissipation of heat. The first, second and third air flow paths defined within the housing all extend primarily along a direction parallel to the longitudinal axis of the shaft 708.

The electric motor assembly 700 further includes an air flow source (e.g. a fan), which is arranged to generate an air flow along the air flow paths defined within the housing. In particular, the air flow source may generate air flows along the first, second and third air flow paths in the housing 706. For example, the air flow source may comprise a fan mounted at an air inlet and/or an air outlet of the housing 706, and arranged to generate an air flow along each of the air flow paths defined in the housing 706. The housing 706 may include an air inlet and an air outlet which are arranged at opposite ends of the housing with respect to the longitudinal axis of the shaft 708, such that air flow within housing 706 occurs primarily in a direction parallel to the longitudinal axis of the shaft 708.

A power steering system comprising the electric motor assembly 700 may be configured to control the three electric motors 702 in a similar manner to control of the first and second electric motors 502, 504 of the electric motor assembly 500 discussed above. In particular, a control unit of the power steering system may control an amount of torque applied by each of the three electric motors 702 to the shaft

708, e.g. depending on a performance of each of the electric motors 702, and/or based on a temperature of each of the electric motors 702.

Figure 8A:
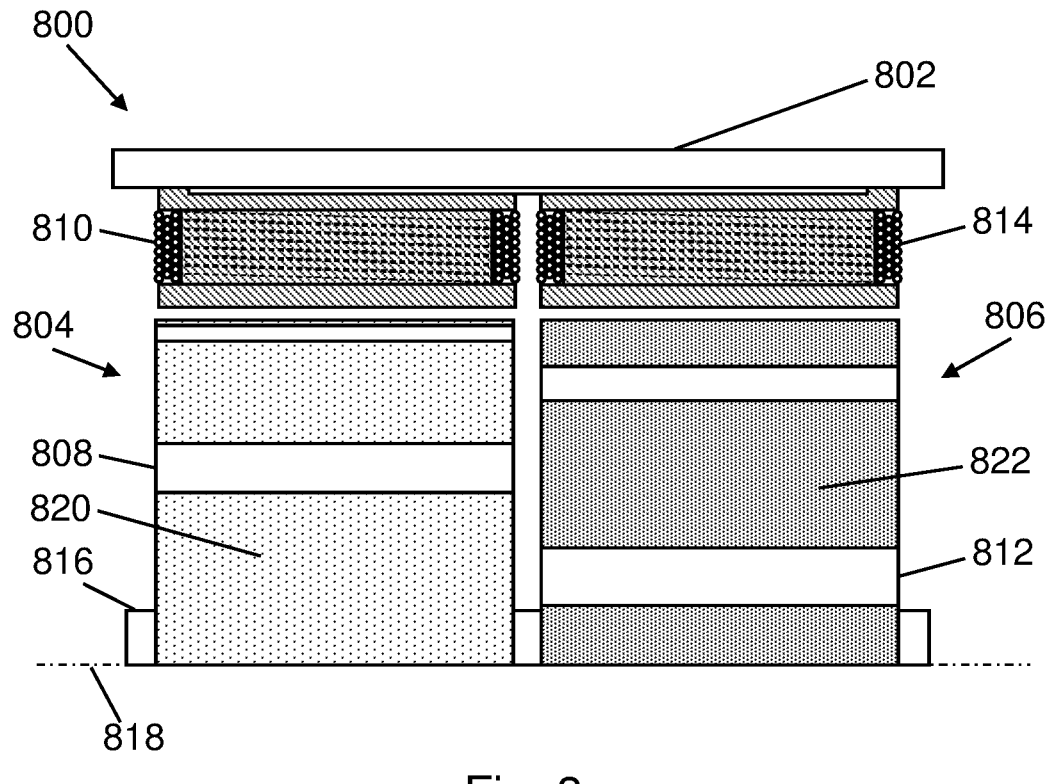
FIG. 8a is a schematic partial cross-sectional side view of a motor assembly that is part of an electric power steering system according to an embodiment of the invention.
Figure 8B:
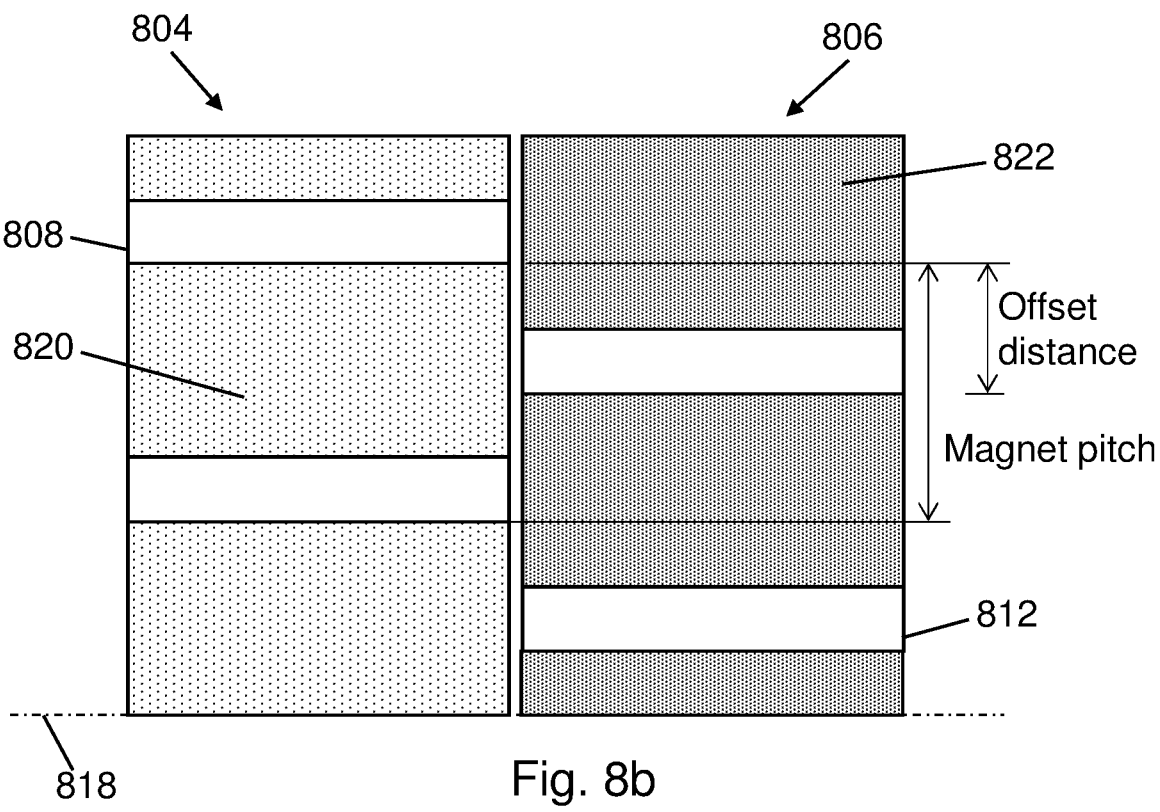

FIGS. 8*a* and 8*b* illustrate how two electric motors may be coupled to a common shaft, in a manner that cancels the cogging torques exerted by the electric motors on the shaft. FIG. 8*a* shows a partial cross-sectional view of a motor assembly 800 that may be part of a power steering system that is an embodiment of the second aspect of the invention.

The electric motor assembly 800 includes a motor casing 802, in which a first electric motor 804 and a second electric motor 806 are disposed. The first electric motor 804 includes a first rotor 808 and a first stator 810, and the second electric motor 806 includes a second rotor 812 and a second stator 814. The first rotor 808 and the second rotor 812 are both coupled to a shaft 816, such that the first and second electric motors 804, 806 can each apply a respective torque to the shaft 816. A longitudinal axis of the shaft 816 is depicted by the dashed line 818. For illustration purposes, the motor casing 802, the first stator 810 and the second stator 814 are shown in cross-section in FIG. 8*a*, in order to reveal the first rotor 808 and second rotor 812, the exterior surfaces of which are shown (rather than their cross-sections). Additionally, it will be noted that only half of the motor assembly 800 is illustrated in FIG. 8*a*.

The first stator 810 and the second stator 814 are identical and are aligned with one another along the longitudinal axis of the shaft 816. In particular, the first and second stators 810, 814 have a same angular position with respect to the longitudinal axis of the shaft 816. In this manner, features of the first stator 810 are aligned with corresponding features of the second stator 814 in a direction parallel to the longitudinal axis of the shaft 816. So, for instance the first stator 810 may include a set of teeth which are aligned with a corresponding set of teeth in the second stator 814. In order to achieve precise alignment between the first stator 810 and the second stator 814, each of the first and second stators 810, 814 may comprise a respective key on its outer surface, which slots into a corresponding keyway in the motor casing 802. Of course, other suitable mechanisms for ensuring alignment of the first and second stators 810, 814 may also be used.

The first rotor 808 and the second rotor 812 are identical to one another. In particular, the first and second rotors 808, 812 comprise a same arrangement of permanent magnets, resulting in a same number of and arrangement of magnetic poles in both the first and second rotors 808, 812. In FIG. 8*a*, a set of first magnets 820 on the first rotor 808 is shown, and a second set of magnets 822 on the second rotor 812 is shown. However, in contrast to the first and second stators 810, 814, the first and second rotors 808, 812 are arranged such that there is an angular offset between the two. In particular, the first and second rotors 808, 812 are connected to the shaft 816 such that the first rotor 808 is offset by a quarter of a magnetic cycle of the first electric motor 804 relative to the second rotor 812. The angular offset between the first and second rotors 808, 812 is shown in FIG. 8*a* by the misalignment between the set of first magnets 820 and the set of second magnets 822. This is illustrated more clearly in FIG. 8*b*, which shows an unwrapped view of the first and second stators 808, 812, i.e. where the arrangements of the permanent magnets on the first and second stators 808, 812 are laid flat next to one another.

Here, the magnetic cycle of the first electric motor 804 corresponds to a mechanical cycle of the first electric motor 804 divided by the number of magnetic pole pairs in the first rotor 808. The number of magnetic pole pairs in a rotor may simply be half the number of permanent magnets in the rotor. A mechanical cycle corresponds to a full rotation of the first rotor 808 (and therefore of the shaft 816) about the longitudinal axis of the shaft 816. Of course, the magnetic cycle of the first electric motor 804 is the same as a magnetic cycle of the second electric motor 806, as they both have identical rotors and stators.

As shown in FIG. 8*b*, by arranging the first and second rotors 808, 812 such that they are offset by a quarter of a magnetic cycle, the set of second magnets 822 is offset from the set of first magnets 820 by a circumferential distance on the second rotor 812 corresponding to half a magnet pitch. The magnet pitch is the same on both the first and second rotors 808, 812, and corresponds to a period of the arrangement of permanent magnets on the first and second rotors 808, 812. Thus, a circumferential distance between two corresponding points on the first and second rotors 808, 812 corresponds to a circumference of the rotor (the circumference of both first and second rotors 808, 812 is the same) divided by half the number of permanent magnets on the rotor. In other words, a centre of each permanent magnet on the first rotor 808 is aligned with a centre of a gap between two permanent magnets on the second rotor 812. As an example, where the rotor circumference is 600 mm and there could be 30 pole pairs (i.e. 60 permanent magnets), the circumferential distance between corresponding points on the first and second rotors 808, 812 would be 600/30=20 mm. A similar calculation can be done to determine the angular offset between corresponding points on the first and second rotors 808, 812: with one mechanical revolution corresponding to $2\pi$ radians, and with the number of pole pairs being 30, the angle between corresponding points on the first and second rotors 808, 812 would be $2\pi/30=\pi/15$ radians.

Figure 9:
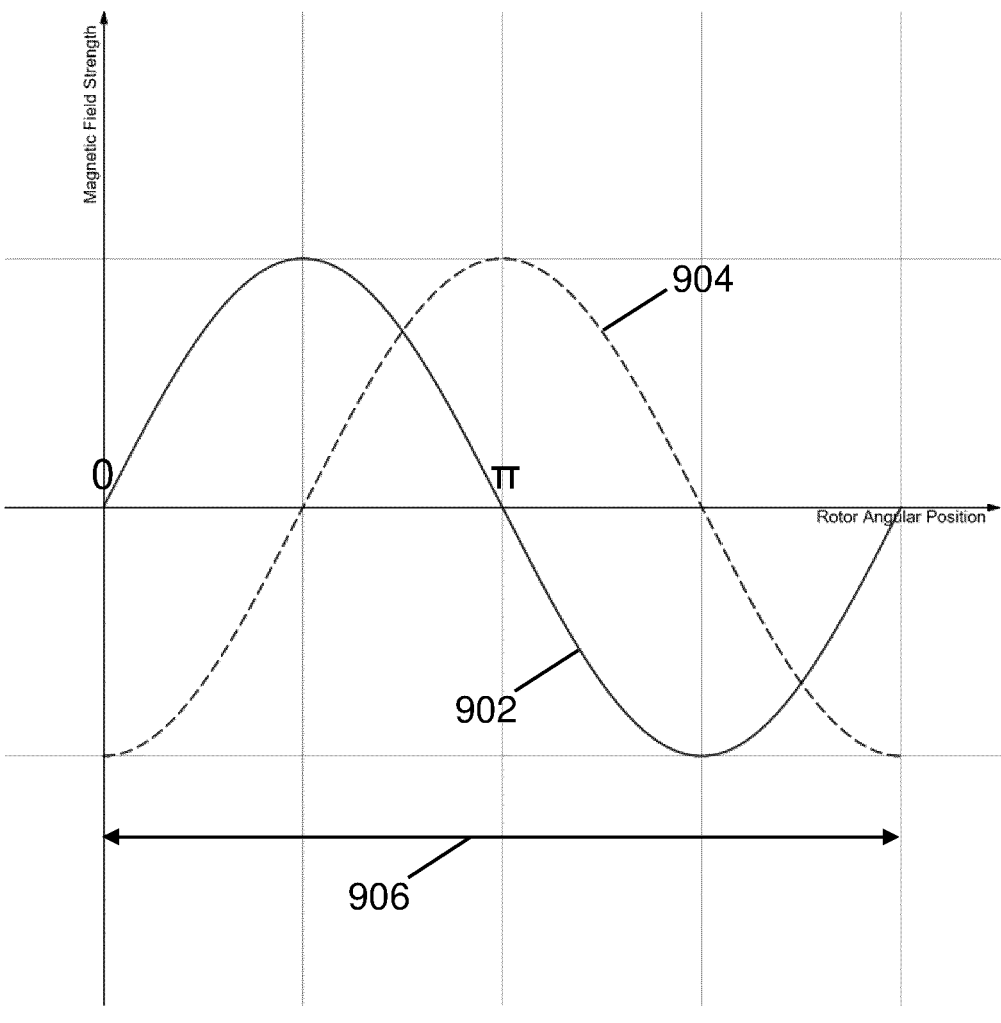
Figure 10:
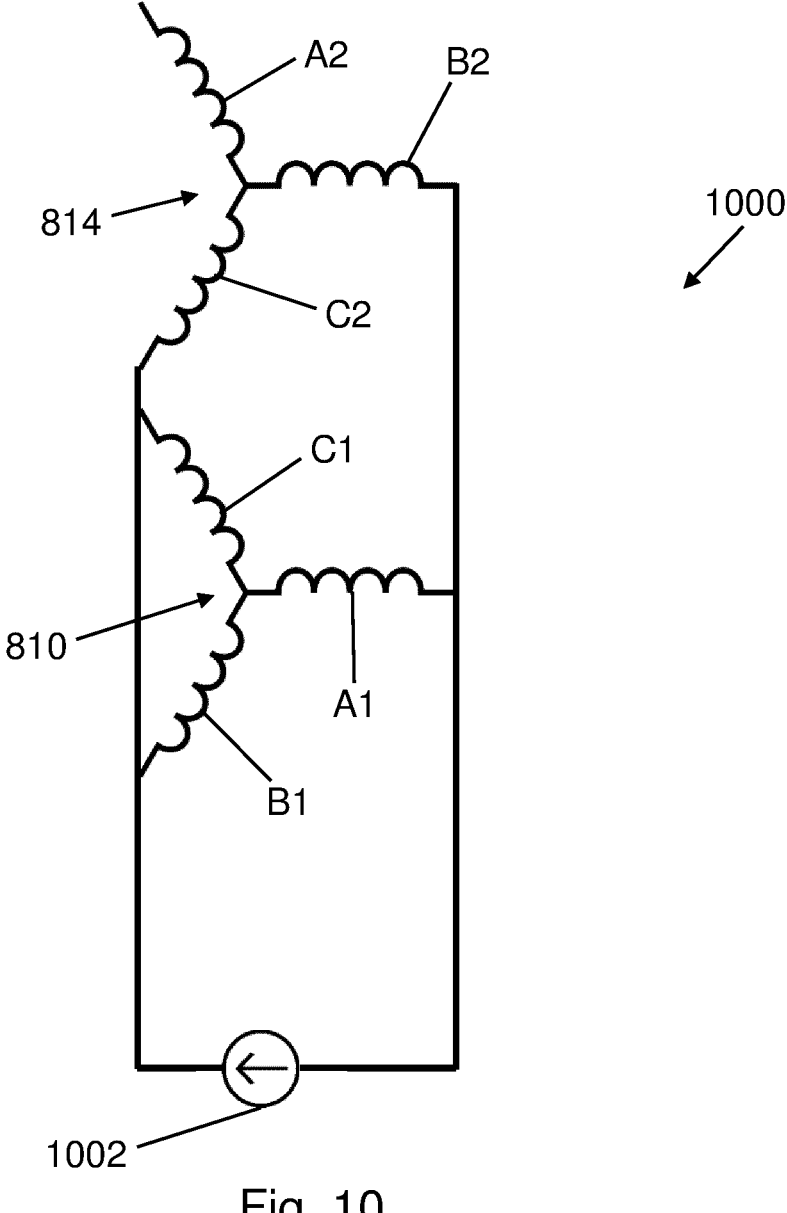

FIG. 9 shows a graph of magnetic field strength for the first and second rotors 808, 812, as a function of angular position of the rotor. The curve 902 in FIG. 9 corresponds to the magnetic field strength of the first rotor 808 and, and the curve 904 corresponds to the magnetic field strength of the second rotor 812. The magnetic field strength of each rotor corresponds to a strength of the magnetic field produced by the rotor at a fixed point in the corresponding stator, as the angular position of the rotor is varied (i.e. as it is rotated about the longitudinal axis of the shaft 816). The magnetic field results from the arrangement of permanent magnets in the rotor.

As can be seen in FIG. 9, the magnetic field strengths for both the first and second rotors 808, 812 are sinusoidal, and are out of phase with one another by a quarter of a magnetic cycle, the magnetic cycle length being indicated by arrows 906. As a result, a peak magnetic field strength of the first rotor 808 is aligned with an inversion point in the magnetic field strength of the second rotor 812. In other words, at a position where the first rotor 808 is at maximum magnetic field strength, the magnetic field strength from the second rotor 812 crosses between positive and negative, i.e. it is zero. It should be noted that although FIG. 9 depicts sinusoidal waveforms, different arrangements of permanent magnets in the first and second stators 808, 812 may be used, which may result in different (e.g. non-sinusoidal) periodic waveforms.

Due to the angular offset between the first rotor 808 and the second rotor 812, the first electric motor 804 and the second electric motor 806 exert cogging torques on the shaft 816 having a same magnitude but opposing directions, such that the cogging torques cancel each other out. As a result, there may be reduced or no net cogging torque exerted on the shaft 816, such that the shaft 816 may smoothly be rotated about its longitudinal axis. An offset between the first and second rotors 808, 812 of a quarter of the magnetic field cycle may result in a complete cancellation of the cogging torques exerted on the shaft 816. However, other offsets may also be used, which may result in an at least partial cancellation of the cogging torques. In alternative embodiments, a similar cancellation of the cogging torque may be achieved, by aligning the first and second rotors 808, 812, and instead offsetting the first and second stators 810, 814 by a quarter of a magnetic field cycle.

The principles discussed above in relation to FIGS. 8a-b and 9 may be applied to embodiments above which include multiple electric motors, in order to at least partially cancel the cogging torque exerted on the shaft. For example, the first and second motors 502, 504 of the electric motor assembly 500 may be coupled to the shaft 208 in the manner described above in relation to the first and second electric motors 804, 806.

Similar principles may also be applied when there are more than two motors for cancelling the cogging torque. For example, where the electric motor assembly 800 further include a third electric motor (e.g. mounted on the shaft 816 to the right of the second electric motor 806 in FIG. 8a), which is identical to the first and second electric motors 804, 806. Then, the first and second electric motors 804, 806 may be coupled to the shaft 816 so that they are out of phase by a sixth of a magnetic field cycle, and the third electric motor may be couple to the shaft 816 such that it is out of phase with the second electric motor 806 by a sixth of a magnetic field cycle and out of phase with the first electric motor 804 by two sixths of a magnetic field cycle. In this manner, the cogging torques exerted by each of the electric motors on the shaft 816 may smooth each other out. More generally, where there are N electric motors coupled to the shaft 816, they may be arranged such that each electric motor is out of phase by ½N of the magnetic cycle with respect to electric motors that are adjacent to it on the shaft 816, in order to achieve at least some cancellation of the cogging torques.

A technique will now be described for coupling the first rotor 808 and the second rotor 812 to the shaft 816, to ensure that the desired offset of a quarter of a magnetic field cycle is accurately achieved. The technique will be described with reference to FIG. 10, which shows a circuit diagram 1000 where the first stator 810 and the second stator 814 are coupled to a current source 1002. In the example shown, the first and second stators 810, 814 are both 3-phase stators (e.g. the first and second electric motors 804, 806 may be 3-phase electric motors). The three phases of the first stator 810 are indicated as A1, B1 and C1 in FIG. 10, and the three phases of the second stator 814 are indicated as A2, B2 and C2 in FIG. 10.

To start, the first and second stators 810, 814 are aligned with one another, e.g. by mounting them in the motor casing 802 using the keyways discussed above to ensure accurate alignment. Then, each of the first rotor 808 and the second rotor 812 is connected to a respective shaft. The respective shafts are not coupled together, so that the first and second rotors 808, 812 can move independently of one another at this stage. Then, the first and second stators 810, 814 are connected to the current source 1002, as shown in the circuit diagram of FIG. 10. In particular, as can be seen from FIG. 10, the first and second stators 810, 814 are connected to the current source 1002 such that:

$$I_{A1}=-2I_{B1}=-2I_{C1}$$

$$I_{A2}=0$$

$$I_{B2}=-I_{C2}$$

where $I_{A1}$ is a current passing through phase A1 of the first stator 810; $I_{B1}$ is a current passing through phase B1 of the first stator 810; $I_{C1}$ is a current passing through phase C1 of the first stator 810; $I_{A2}$ is a current passing through phase A2 of the second stator 814; $I_{B2}$ is a current passing through phase B2 of the second stator 814; and $I_{C2}$ is a current passing through phase C2 of the second stator 814. The phase A2 of the second stator 814 is left floating so that no current passes through it.

The current source 1002 is then operated to generate a current. This results in currents flowing through the first and second stators 810, 814, in accordance with the above relationships. In this manner, the first rotor 808 is held in a fixed position due to a magnetic field generated in the first stator 810. Similarly, the second rotor 812 will be held in a fixed position due to a magnetic field generated in the second stator 810. As a result of the different currents flowing through the various phases of the first and second stators 810, 814, the second rotor 812 will be held at a position that is out of phase relative to the first rotor 808 by a quarter of a magnetic field cycle. Then, while maintaining the current from the current source 1002, the first and second rotors 808, 812 may be coupled to a common shaft (e.g. shaft 816), in order to fix their relative positions. Such a technique may ensure accurate angular positioning of the first and second rotors 808, 812, which may ensure effective cancellation of the cogging torque. It should be noted that, whilst the motor casing 802 may be used for the alignment process, a separate mounting jig may also be used instead of the motor casing 802.

The invention claimed is:

1. An electric power steering system for a vehicle, the electric power steering system comprising:

an electric motor configured to provide mechanical power to a steering mechanism of the vehicle, the steering mechanism adapted to steer the vehicle;

a housing comprising an inner housing and an outer housing, the inner housing having said electric motor disposed therein, said outer housing being disposed around the inner housing, wherein a gap between the inner housing and the outer housing defines an air flow path; and an air flow source arranged to generate an air flow along the second fixed part so as to cool said electric motor, said air flow source being independent from said electric motor, wherein said electric motor has a first electric motor and a second electric motor, wherein both of the first electric motor and the second electric motor are disposed in said housing and configured to respectively apply a torque to a common shaft used to steer the vehicle, said air flow source being configured to cool the first electric motor and the second electric motor.

2. A vehicle comprising the electric power steering system of claim 1.

3. The electric power steering system of claim 1, wherein the plurality of fins are configured to accelerate the air flow or to increase turbulence of the air flow along the air flow path.

4. The electric power steering system of claim 1, wherein a height of at least one fin of the plurality of fins adjacent to the air inlet is smaller than a height of another fin of the plurality of fins away from the air inlet.

5. The electric power steering system of claim 1, wherein the plurality of fins are configured to uniformly distribute air flowing along the air flow path.

6. The electric power steering system of claim 1, wherein the plurality of fins are aligned along substantially parallel planes.

7. The electric power steering system of claim 1, wherein the air flow path has a plurality of branches configured to cool different portions of said electric motor.

8. The electric power steering system of claim 1, wherein the air flow path is defined at least in part by a channel formed in a wall of said housing.

9. The electric power steering system of claim 1, wherein the air flow path is defined at least in part by a surface of said electric motor.

10. The electric power steering system of claim 1, wherein the air flow path is defined at least in part by a gap between a rotor and a stator of said electric motor.

11. The electric power steering system of claim 1, wherein the air flow path extends around at least a portion of a circumference of said electric motor.

12. The electric power steering system of claim 1, wherein said housing has a plurality of fins that guide air flow along the air flow path, the plurality of fins being disposed on at least one of the inner housing and the outer housing, the plurality of fins being arranged in the gap between the inner housing and the outer housing.

13. The electric power steering system of claim 1, wherein said air flow source comprises a fan mounted on said housing.

14. The electric power steering system of claim 1, wherein said housing has an air inlet and an air outlet, the air flow path extending between the air inlet and the air outlet.

15. The electric power steering system of claim 14, further comprising:

an air filter positioned adjacent at least one of the air inlet and the air outlet.

16. The electric power steering system of claim 1, wherein the air inlet and the air outlet are arranged on opposite sides of said housing.

17. The electric power steering system of claim 1, further comprising:

a controller, said air flow source adapted to cool said controller.

18. The electric power steering system of claim 17, wherein said controller is positioned in said housing.

19. The electric power steering system of claim 18, wherein said electric motor is disposed in a first portion of said housing, said controller being disposed in a second portion of said housing, the air flow path has a first air flow path defined in the first portion of said housing and a second air flow path defined in the second portion of said housing, wherein said air flow source generates the air flow along the first air flow path and the second fixed part so as to respectively cool said electric motor and said controller.

* * * * *